(12) United States Patent
Kurosawa

(10) Patent No.: US 11,074,399 B2
(45) Date of Patent: Jul. 27, 2021

(54) INFORMATION PROCESSING APPARATUS, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Akira Kurosawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/549,016

(22) Filed: Aug. 23, 2019

(65) Prior Publication Data
US 2020/0250261 A1 Aug. 6, 2020

(30) Foreign Application Priority Data
Feb. 1, 2019 (JP) .............................. JP2019-016786

(51) Int. Cl.
*G06F 40/169* (2020.01)
*G06Q 10/06* (2012.01)
*G06F 3/041* (2006.01)

(52) U.S. Cl.
CPC .......... *G06F 40/169* (2020.01); *G06F 3/0412* (2013.01); *G06F 3/0416* (2013.01); *G06Q 10/06311* (2013.01); *G06Q 10/063114* (2013.01); *G06Q 10/063118* (2013.01)

(58) Field of Classification Search
CPC ..... G06Q 10/06311; G06Q 10/063114; G06Q 10/063118; G06F 40/169; G06F 3/0412; G06F 3/0416
See application file for complete search history.

(56) References Cited

U.S. PATENT DOCUMENTS

| 2004/0017400 A1* | 1/2004 | Ly ........................... G06Q 10/06 715/810 |
| 2005/0091578 A1* | 4/2005 | Madan .................. G06F 40/169 715/201 |
| 2007/0050225 A1* | 3/2007 | Leslie .................... G06Q 10/06 705/7.21 |
| 2008/0172625 A1* | 7/2008 | Montgomery ... G06Q 10/06311 715/764 |
| 2009/0233629 A1* | 9/2009 | Jayanthi .................. H04L 51/20 455/457 |
| 2011/0276896 A1* | 11/2011 | Zambetti ............. H04L 12/1813 715/751 |
| 2013/0326363 A1* | 12/2013 | Meintanis ............... G06F 16/26 715/750 |

(Continued)

FOREIGN PATENT DOCUMENTS

| JP | 2010-066868 A | 3/2010 |
| JP | 5704508 B2 | 4/2015 |

*Primary Examiner* — Daniel Samwel
(74) *Attorney, Agent, or Firm* — Oliff PLC

(57) ABSTRACT

An information processing apparatus includes a setting unit, a sticky note screen generator, and an allocation unit. The setting unit is configured to set a person-in-charge for a position on a mount. The sticky note screen generator is configured to generate a sticky note screen displaying the mount and a sticky note attached to the mount. The allocation unit is configured to, in accordance with a position of the sticky note attached to the mount, allocates contents of the sticky note to the person-in-charge corresponding to the position.

11 Claims, 21 Drawing Sheets

(56) References Cited

U.S. PATENT DOCUMENTS

| | | | |
|---|---|---|---|
| 2015/0082281 A1* | 3/2015 | Koenig | G06F 11/3668 |
| | | | 717/124 |
| 2015/0121191 A1* | 4/2015 | Nakamori | G06F 40/169 |
| | | | 715/230 |
| 2015/0199641 A1* | 7/2015 | Napoli | G06Q 10/063114 |
| | | | 705/7.15 |
| 2016/0292620 A1* | 10/2016 | De | G06Q 10/063118 |
| 2017/0109684 A1* | 4/2017 | Liu | G06Q 10/063114 |
| 2017/0193422 A1* | 7/2017 | Frieden | G06Q 10/06311 |
| 2017/0255369 A1* | 9/2017 | Noda | G06F 3/0482 |

\* cited by examiner

FIG. 4

| CONFERENCE ID | CONFERENCE NAME | DATE AND TIME | MOUNT ID | NUMBER OF PARTICIPANTS | PARTICIPANT ID |
|---|---|---|---|---|---|
| 410 | 415 | 420 | 425 | 430 | 435 |
|  |  |  |  |  |  |

| MOUNT ID | MOUNT PATTERN ID | CREATION DATE AND TIME | CREATOR |
|---|---|---|---|
| 510 | 515 | 520 | 525 |
|  |  |  |  |

| MOUNT ID | NUMBER OF REGIONS | REGION ||||  PERSON-IN-CHRAGE | ... |
|---|---|---|---|---|---|---|---|
|  |  | X | Y | W | H |  |  |
| 610 | 615 | 625 | 630 | 635 | 640 | 645 |  |
|  |  |  |  |  |  |  | ... |

| 710 | 712 | 715 | 720 | 725 | 730 | 735 | 740 | 745 |
|---|---|---|---|---|---|---|---|---|
| STICKY NOTE ID | MOUNT ID | ATTACHMENT POSITION | SIZE | CREATION DATE AND TIME | CREATOR | ATTACHMENT DATE AND TIME | COLOR | FRAME LINE SHAPE |
| F0001 | D0001 | (100, 200) | (10, 5) | | KF | | | |

| 750 | 755 | 760 | 765 | 770 | 775 |
|---|---|---|---|---|---|
| FRAME LINE COLOR | FRAME LINE THICKNESS | BELONGING GROUP | TYPE | CONTENTS TYPE | CONTENTS |
| | | | | TEXT | |

| ToDoID | ToDo | PERSON-IN-CHARGE | DEADLINE | PROGRESS STATUS | STICKY NOTE ID |
|---|---|---|---|---|---|
| | | | | | |

FIG. 18

| MOUNT ID | DRAWING ID | NUMBER OF COMPONENTS | COMPONENT ID | PERSON-IN -CHARGE | ... |
|---|---|---|---|---|---|
| | | | | | ... |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-016786 filed Feb. 1, 2019.

BACKGROUND

(i) Technical Field

The present disclosure relates to an information processing apparatus, an information processing system, and a non-transitory computer readable medium.

(ii) Related Art

JP-A-2010-066868 discloses a system capable of realizing an electronic sticky note that is created by clarifying a relationship with an electronic file and is attached with good convenience, where the system allows an electronic sticky note to be attached to a running application or opened files in the application, and where, in a case where the running application receives a window message using a system hook, a target list of the electronic sticky note is generated by acquiring identification information of the application or a related file, the electronic sticky note including the identification information of any application or the related file is created as such and stored, and in a case where the electronic sticky note is replaced, a display/non-display of the electronic sticky note is linked to the display/non-display of the file.

JP-B-5704508 discloses an electronic sticky note generation display program capable of changing a display position of the electronic sticky note according to a change of a layout of contents of a web page and a structure, where the electronic sticky note generation display program causes a computer to execute a step of, based on position information indicating a place of contents of the web page for which the attachment of the electronic sticky note is specified, estimating the most similar place to the attachment place of the electronic sticky note in the web page, and a step of rewriting a source of the web page such that the electronic sticky note is displayed to the place estimated, and where the position information includes a tag, an attribute, and contents of the tag of the place of the contents for which the attachment of the electronic sticky note is specified, and the most similar place to the attachment place of the electronic sticky note is a place where the number of matches of the tag, the attribute, and the contents of the tag is the largest.

In a conference, an operation of attaching the sticky note to the mount using an electronic sticky note system is performed.

However, in the conference, it is assumed that each person-in-charge has the conference while writing and attaching a task to be done (so-called ToDo) to the sticky note or moving the sticky note.

SUMMARY

Aspects of non-limiting embodiments of the present disclosure relate to an information processing apparatus, an information processing system, and a non-transitory computer readable medium capable of allocating a task to be done to a person-in-charge even though a user does not allocate the task to be done to the person-in-charge after a task for a sticky note on a mount is completed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a setting unit configured to set a person-in-charge for a position on a mount; a sticky note screen generator configured to generate a sticky note screen displaying the mount and a sticky note attached to the mount; and an allocation unit configured to, in accordance with a position of the sticky note attached to the mount, allocates contents of the sticky note to the person-in-charge corresponding to the position.

BRIEF DESCRIPTION OF THE DRAWINGS

Exemplary embodiment(s) of the present disclosure will be described in detail based on the following figures, wherein:

FIG. 4 is a diagram illustrating an example of a data structure of a conference information table;

FIG. 5 is a diagram illustrating an example of a data structure of a mount information table;

FIG. 6 is a diagram illustrating an example of a data structure of a region and person-in-charge allocation table;

FIG. 7 is a diagram illustrating an example of a data structure of a sticky note information table;

FIG. 8 is a diagram illustrating an example of a data structure of a ToDo management table;

FIG. 18 is a diagram illustrating an example of a data structure of a component and person-in-charge allocation table;

DETAILED DESCRIPTION

Hereinafter, an example of an exemplary embodiment in implementing the present disclosure will be described with reference to the accompanying drawings.

Figure 1:
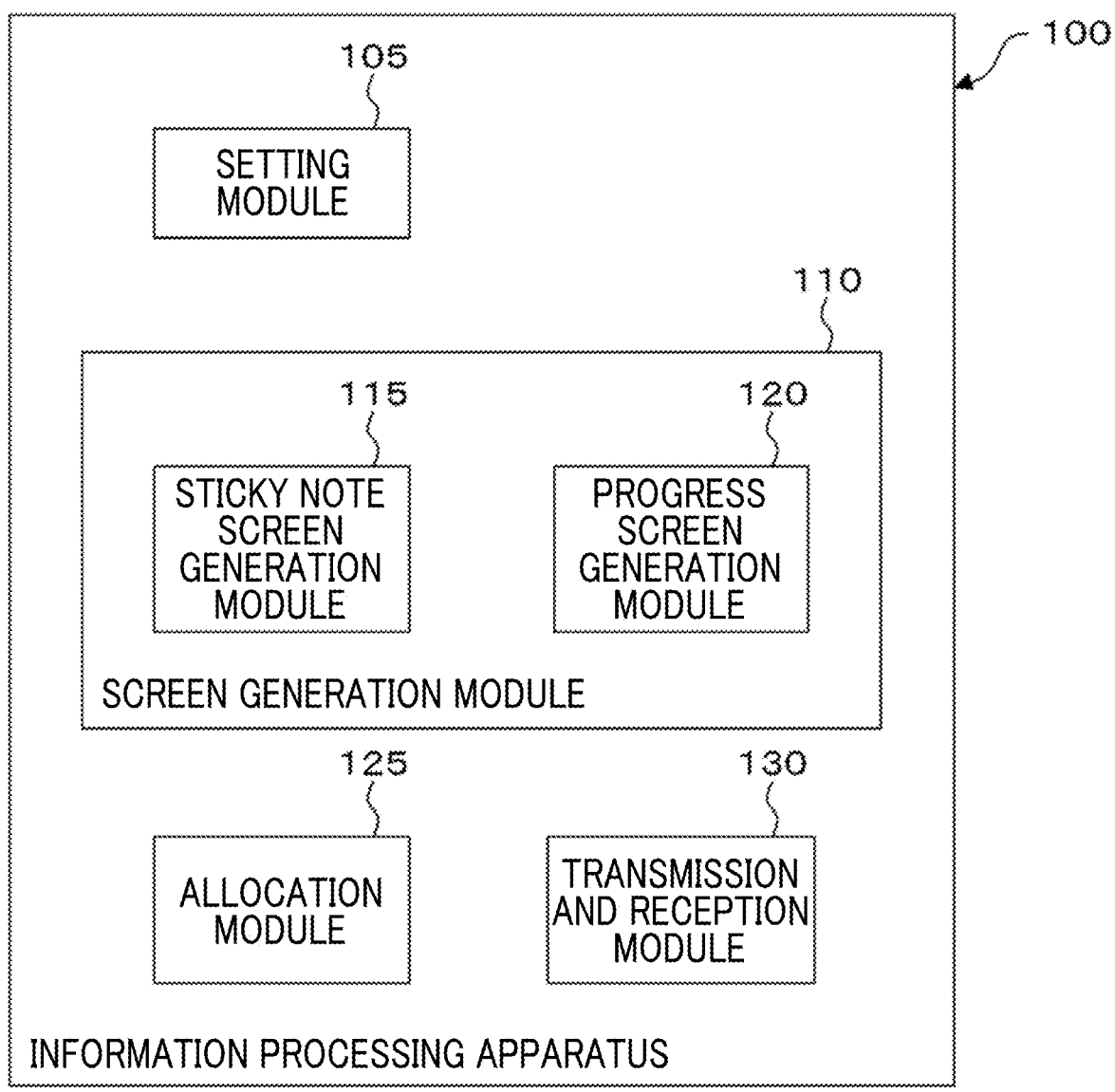
FIG. 1 is a conceptual module configuration diagram illustrating a configuration example according to an exemplary embodiment.

FIG. 1 is a conceptual module configuration diagram illustrating a configuration example of the present exemplary embodiment.

Here, the term "module" refers to a component, such as software (including computer programs as an interpretation of software) and hardware, which is generally capable of being logically separated. Consequently, the term "module" in the present exemplary embodiment not only refers to a module in a computer program, but also to a module in a hardware configuration. Thus, the present exemplary embodiment also serves as a description of a computer program (a program that causes a computer to execute each procedure, a program that causes a computer to function as each unit, or a program that causes a computer to realize each function), a system, and a method for executing functions as such a module. Meanwhile, although terms like "store" and "cause something to store" and equivalents thereof may be used in the description for the sake of convenience, these terms mean that a storage apparatus is made to store information or that a control is performed such that a storage apparatus stores information, in the case of an exemplary embodiment in which a computer program is described. In addition, a module may correspond to one function. However, in some implementations, a module may be configured to correspond to one program, or plural modules may form one program. Conversely, one module may be formed by plural programs. Moreover, plural modules may be executed by one computer, and one module may be executed by plural computers in a distributed or parallel computing environment. A single module may include another module. Hereinafter, the term "connection" may be used to refer to the logical connection (such as the transmission and reception of data, instructions, a referential relationship between pieces of data, and log-in) in addition to the physical connection. The term "predetermined" means "determination before target processing," which not only includes "determination" before a process according to the exemplary embodiment starts and but also includes "determination" after the process according to the exemplary embodiment starts but before the target processing is performed, based on a status or state at that time, or a status or state up to that time. In the case of plural "predetermined values", the predetermined values may be different values from each other, or two or more thereof ("two or more" includes, of course, all values) are the same. Additionally, a description "performing B in a case of A" is used in the meaning of "determining whether or not A holds true, and performing B in the case where it is determined that A holds true. However, a case where a determination of whether or not A holds good is unnecessary is excluded. Additionally, listing things such as "A, B, C" is illustrative listing unless otherwise indicated, and includes a case where only one of them is selected (for example, only A).

In addition, the terms "system" and "apparatus" not only encompass configurations in which plural computers, hardware, or apparatuses are connected by a communication tool such as a network (including connection that supports one-to-one communication), but also encompass configurations implemented by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, target information is retrieved from a storage apparatus, and the processing results are written back to the storage apparatus after the processing. Consequently, the description of the retrieval from a storage apparatus before processing and the writing back to a storage apparatus after processing may be omitted in some cases. Meanwhile, the storage apparatus mentioned above may include a hard disk drive, a random access memory (RAM), an external storage medium, storage apparatus accessed via a communication line, and registers, and the like inside a central processing unit (CPU).

An information processing apparatus 100 of the present exemplary embodiment is used in a conference, has a function of performing processing regarding the electronic mount and sticky note, and includes a setting module 105, a screen generation module 110, an allocation module 125, and a transmission and reception module 130 as illustrated in the example of FIG. 1. The information processing apparatus 100 supports the conference by attaching the sticky note to the mount. In addition, the information processing apparatus 100 includes, for example, an electronic sticky note control device, an electronic sticky note system, and an electronic white board, and the like. Additionally, the sticky note includes, for example, the electronic sticky note, an electronic card, and the like.

The conference may be a meeting at which plural people can gather and talk with each other, and includes, for example, a gathering, a workshop, an idea extraction meeting, an examination meeting, a consultation, a discussion, a congregation, a meeting, and the like.

Figure 3A:
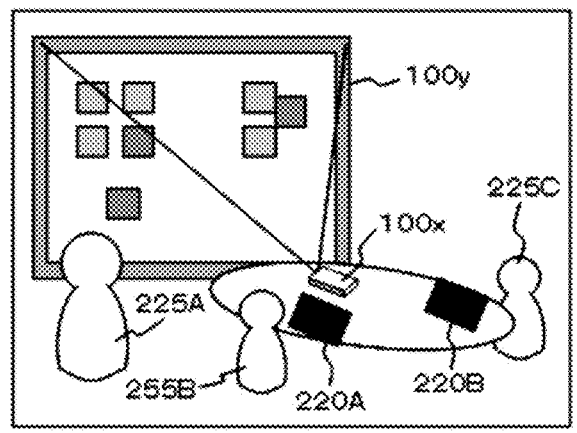
FIGS. 3A to 3C are diagrams illustrating a usage example of a user terminal and an information processing apparatus in a conference room or the like in which the present exemplary embodiment is used.
Figure 3B:
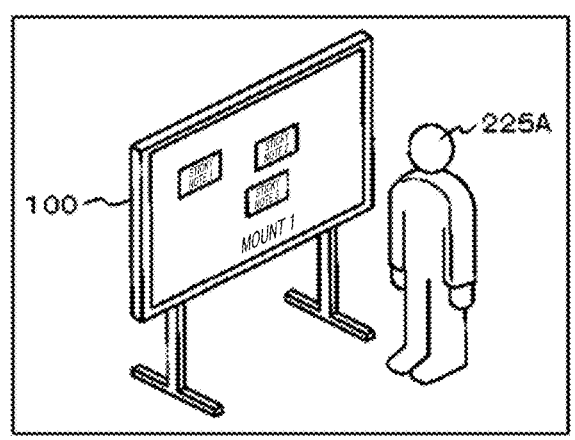
Figure 3C:
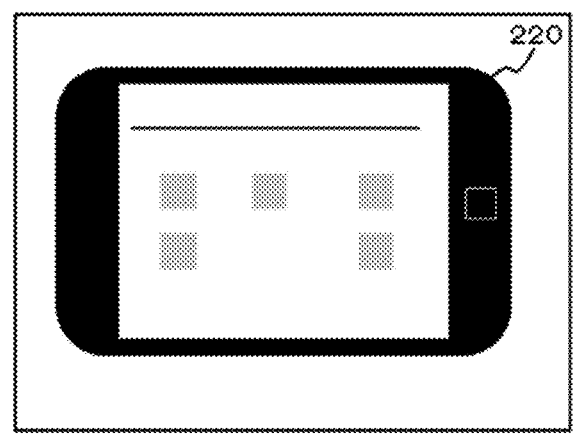

The information processing apparatus 100 is specifically used at a conference held by a facilitator (generally, one person) and plural users by using sticky notes. The participant creates a sticky note in which an idea and the like are written, by using a user terminal 220 as a participant terminal. Generally, as illustrated in the example of FIGS. 3A to 3C, there are plural user terminals 220, such as a user terminal 220A, a user terminal 220B and the like (hereinafter, representatively referred to as user terminals 220), each being owned by a participant. The information processing apparatus 100 receives the sticky note from the user terminal 220, and attaches the sticky note to the mount. The facilitator determines or changes a position of the sticky note on the mount by using a shared screen which is a display apparatus of the information processing apparatus 100, and performs creation of a sticky note of its own, and the like to progress an assembly. In the present exemplary embodiment, the facilitator is included in the users.

The setting module 105 sets a person-in-charge for a position on a mount.

Here, the mount may be an image. The setting module 105 may associate the persons-in-charge with partial images that are parts of the image, respectively.

As a specific example, a drawing may be used as the mount, and the person-in-charge is associated according to components in the drawing.

The "drawing" may include a three-dimensional image in addition to the two-dimensional image. Specifically, a 3D CAD drawing may be used as a mount.

In addition, "setting" may be performed in accordance with an operation on the mount of the user (for example, facilitator) and set a predetermined person-in-charge for a predetermined position. For example, as "the operation on the mount", a user may surround a region and select the person-in-charge from a name list of group members in the region.

The screen generation module 110 includes a sticky note screen generation module 115 and a progress screen generation module 120. The screen generation module 110 generates a sticky note screen for displaying a mount and a sticky note and a progress screen for displaying progress information of a task to be done, and performs control so as to display on a screen. Here, the screen may be a large screen that can be viewed by plural users, as will be described later using the example of FIGS. 3A to 3C. In addition, the sticky note screen and the progress screen may be separately displayed, or both may be displayed on one screen. When both the sticky note screen and the progress screen may be displayed on one screen, they may be displayed in two windows, each occupying one window, or the progress screen may be displayed in a pop-up window for a sticky note.

The sticky note screen generation module 115 generates the sticky note screen displaying a mount and a sticky note attached to the mount. Specifically, a screen in the sticky note system is generated.

Further, when progress status on the progress screen is changed by a user's input, the sticky note screen generation module 115 may update a sticky note corresponding to a changed task to be done with respect to the progress status. Specifically, when the progress status is received on the progress screen, the progress status is reflected on the sticky note in the sticky note screen. Here, the "progress status" indicates the degree of progress.

In addition, when the transmission and reception module 130 receives a reply, the sticky note screen generation module 115 may update a sticky note corresponding to the contents thereof. Specifically, when a report on the progress status is received from each person-in-charge, the progress status is reflected on the sticky note in the sticky note screen.

The progress screen generation module 120 generates a progress screen displaying the task to be done, a person-in-charge to do the task, and a progress status in association with one another. For example, a table having a field of the task to be done, a field of the person-in-charge, and a field of the progress status may be displayed and the progress status may be displayed as a graph (for example, a time chart, a pie chart, and the like).

The progress screen generation module 120 may change the displayed progress status in accordance with the user's input.

Here, "in accordance with the user's input" corresponds, for example, to the operation or the like for selecting a completion flag and the like.

Depending on a position of the sticky note attached to the mount, the allocation module 125 allocates contents of the sticky note to the person-in-charge corresponding to the position.

Here, the expression "allocates the contents of the sticky note to the person-in-charge" means that the information processing apparatus 100 stores the contents of the sticky note in association with the person-in-charge, or makes the user recognize the contents of the sticky note as a task to be done by the person-in-charge. As a specific example of the latter, adding the contents of the sticky note to a ToDo list as the ToDo to be done by the person-in-charge and transmitting the contents of the sticky note to the person-in-charge as a message are included. In addition, the ToDo list may be generated by the information processing apparatus 100 itself, or may be generated by an external apparatus different from the information processing apparatus 100. The external apparatus may be a task management apparatus 200 or a user terminal 220 to be described later using the example of FIG. 2, as a specific example.

The "person-in-charge" may be one person, plural persons, or an organization. Here, the organization may be a group having plural people, for example.

The allocation module 125 adds the contents to the progress screen in association with the person-in-charge as a task to be done.

In addition, the allocation module 125 may transmit the contents of the sticky note as the message to the person-in-charge via the transmission and reception module 130.

For example, using a table in which a person-in-charge is associated with a terminal ID, the message may be transmitted to the terminal associated with the terminal ID associated with the person-in-charge, transmitted to the mail address of the person-in-charge, and transmitted by the message transmission and reception function in social networking service (for short, SNS) which the person-in-charge uses.

Additionally, the "contents of the sticky note" is the contents of the sticky note allocated to the person-in-charge.

When the sticky note is attached to the partial image on the mount, the allocation module 125 may allocate the contents of the sticky note to the person-in-charge associated with the partial image as a task to be done.

Also, only when the sticky note has an attribute indicating that the sticky note is an allocation target by the allocation module 125, the allocation module 125 may allocate the contents of the sticky note to the person-in-charge associated with the position. In other words, when the sticky note has other attributes, the allocation module 125 does not perform allocation. Here, "the sticky note has an attribute indicating that the sticky note is an allocation target by the allocation module 125," specifically, refers to the sticky note having an attribute indicating that it is a ToDo sticky note. Furthermore, the attribute may be set desirably when the user creates a sticky note.

The transmission and reception module 130 transmits and receives messages to and from the person-in-charge.

For example, the transmission and reception module 130 transmits a result of an allocation processing by the allocation module 125 to the terminal. For example, the transmission and reception module 130 receives a reply to the contents of the sticky note from the terminal linked to the person-in-charge.

In addition, when a reply is received from the task management apparatus 200 and the user terminal 220, the reply is passed to the sticky note screen generation module 115. The sticky note screen generation module 115 updates the sticky note according to the reply.

Figure 2:
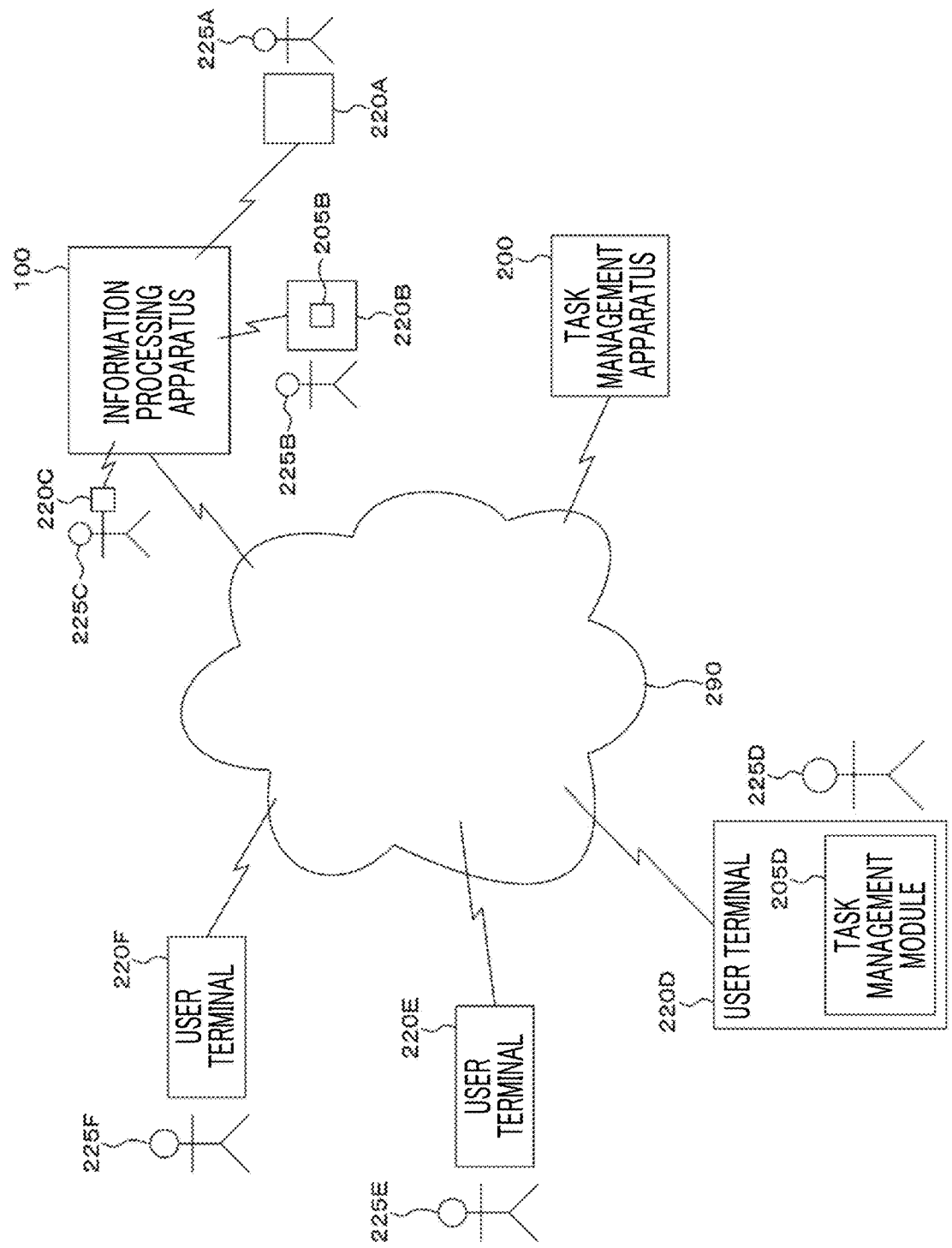
FIG. 2 is a diagram illustrating a configuration example of a system using the present exemplary embodiment.

FIG. 2 is a diagram illustrating a configuration example of a system using the present exemplary embodiment.

The information processing apparatus 100, the user terminal 220A owned by a user 225A, the user terminal 220B owned by a user 225B, and the user terminal 220C owned by a user 225C are connected to one another via a communication line (generally a wireless communication line, but it may also be a wired communication line). A conference is conducted on the information processing apparatus 100 by the user 225A, the user 225B, and the user 225C. A user 225D, a user 225E, and a user 225F belong to the same group as the user 225A and the like who is attending the conference, and although the users 225D to 255F have not participated in the conference, a task to be done may be allocated to them. The user terminal 220 may be a personal computer (including a laptop computer) having a communication function, a portable information communication device (including, for example, a mobile phone, a smartphone, a mobile device, a wearable computer, and the like) and the like.

The information processing apparatus 100, the task management apparatus 200, the user terminal 220D, the user terminal 220E, and the user terminal 220F are connected to one another via a communication line 290. The communication line 290 may be a wireless line, a wired line, or a combination thereof, and may be, for example, the Internet, an intranet, and the like as a communication infrastructure. The task management apparatus 200 manages ToDo lists of the user 225A, the user 225C, the user 225E, and the user 225F, and generates a screen (hereinafter referred to as "ToDo list screen", which is an example of the progress screen) displaying the ToDo list such that each user can view it. The user terminal 220B has a task management module 205B. The user terminal 220D has a task management module 205D. A task management module 205 manages a personal ToDo list and generates a ToDo list screen. In the example of FIG. 2, the task management module 205B in the user terminal 220B manages a ToDo list of the user 225B, and the task management module 205D in the user terminal 220D manages a ToDo list of the user 225D, and the ToDo list screen is generated. A function performed in the task management apparatus 200 may be performed in the information processing apparatus 100. In addition, functions of the information processing apparatus 100 and the task management apparatus 200 may be implemented as a cloud service. The system may have a client-server model system configuration in which the information processing apparatus 100 is a server and the user terminal 220 is a client.

In FIG. 2, the information processing apparatus 100 is taken as an example of the "device for supporting a conference by attaching a sticky note to a mount" and the task management apparatus 200, the user terminal 220B having the task management module 205B, and the user terminal 220D having the task management module 205D are taken as an example of the "device for managing a task to be done".

The information processing apparatus 100 sets a person-in-charge for a position on the mount. The sticky note screen displaying the mount and a sticky note attached to the mount are generated. Furthermore, according to the position of the sticky note attached to the mount, the contents of the sticky note is allocated to the person-in-charge corresponding to the position. An allocation result is transmitted to the task management apparatus 200, the user terminal 220B, or the user terminal 220D.

The task management apparatus 200, the user terminal 220B, or the user terminal 220D receives the allocation result from the information processing apparatus 100. The person-in-charge is allocated a task to be done according to the allocation result.

The task management apparatus 200, the user terminal 220B, or the user terminal 220D manage the progress status of the allocated task to be done. When the progress status is updated, the progress status of the task to be done is transmitted to the information processing apparatus 100.

When the information processing apparatus 100 receives the progress status of the task to be done from the task management apparatus 200, the user terminal 220B or the user terminal 220D, the progress status is described in the sticky note corresponding to the task to be done.

Here, the expression "describe the progress status" may mean simply adding the progress status or changing (including deleting) a part of the description which already exists.

FIGS. 3A to 3C are diagrams illustrating a usage example of the user terminal 220 and the information processing apparatus 100 in the conference room or the like in which the present exemplary embodiment is used.

As shown in the example of FIG. 3A, a participants 225B and 225C and a facilitator 225A are gathered in a conference room and the like. The participant 225B uses the user terminal 220A, and the participant 225C uses the user terminal 220B. Generally, one terminal apparatus (for example, the user terminal 220A or the like) is given to one participant, and is a tablet type terminal that is about the size of a notebook (for example, A4, B5, 7 to 10 inch, and the like) like the user terminal 220 shown in the example of FIG. 3C, and is operated by using a finger or a pen. A sticky note in which text data, a handwritten character, a figure, and the like are described is created by the participant. The terminal apparatus is not limited to the tablet type terminal, and may be a PC (for example, including a laptop computer) which includes a keyboard, a mouse, and the like.

An information processing apparatus 100x shown in the example of FIG. 3A has a projector, and displays the progress screen and the sticky note screen including the mount and the sticky note. In addition, an information processing apparatus 100y is the electronic white board, and by detecting a movement of a finger or a pen of the facilitator 225A, receives an operation of attaching the sticky note to the mount, moving the sticky note, associating the position on the mount with the person-in-charge (that is, the setting of the person-in-charge for the position on the mount), or the like. For example, the information processing apparatus 100y includes a pen, and receives operations for the mount and sticky note by detecting the pen leaving a predetermined pen holder (for example, the facilitator 225A has lifted the pen to operate), and the position of an end part of the pen (for example, the end part of the pen touches the information processing apparatus 100y). For example, a sensor (for example, a sensor that switches on and off by the gravity of the pen, and the like) may be provided in a pen holder to detect which one of plural pens (for example, a black pen, a red pen, a blue pen, and the like) is used. Furthermore, the entire display screen of the information processing apparatus 100y is a touch sensor, and the position and pressure at which the display screen is touched may be detected. In the example, the on and off of the pen are controlled by the pen holder, but the pen holder does not necessarily have to be provided. The on and off of the pen may be controlled on the pen side. Regarding the change of color, the color may be changed by preparing a color palette at a part on the display screen and touching a target color by a pen (or something similar to a pen) without requiring a pen holder, or a pen may be equipped with a function (for example, a button, a slider, and the like) for giving an instruction for changing color.

In addition, the information processing apparatus 100 may be an electronic board as shown in the example of FIG. 3B. The electronic board generally includes a large-screen display apparatus (at least, larger than the display apparatus of the user terminal 220), and the display apparatus is a touch panel and detects a touched position and pressure of the display screen. For example, the screen may be a screen having a size of 80 inches, and the like.

FIG. 4 is a diagram illustrating an example of a data structure of a conference information table 400. In the information processing apparatus 100, the conference information table 400 is stored. The conference information table 400 includes a conference ID field 410, a conference name field 415, a date and time field 420, a mount ID field 425, a number-of-participants field 430, and a participant ID field 435. In the conference ID field 410, information (for example, a conference ID (identification)) for uniquely identifying a conference in the present exemplary embodiment is stored. In the conference name field 415, the conference name of the conference is stored. In the date and time field 420, the date and time when the conference is held (may be the year, month, day, hour, minute, second, and so on, or a combination thereof as an interpretation of "date and time") or a period are stored. In the mount ID field 425, information (that is, mount ID) for uniquely identifying the mount used in the conference in the present exemplary embodiment is stored. In the number-of-participants field 430, the number of participants in the conference is stored. In the participant ID field 435, information for uniquely identifying a participant (as a specific example, a list of the participant IDs) in the present exemplary embodiment is stored.

FIG. 5 is a diagram illustrating an example of a data structure of a mount information table 500. In the information processing apparatus 100, the mount information table 500 is stored. The mount information table 500 includes a mount ID field 510, a mount pattern ID field 515, a creation date and time field 520, and a creator field 525. In the mount ID field 510, a mount ID is stored. In the mount pattern ID field 515, a mount pattern ID as a background is stored. For example, there are patterns which are a table form, drawings and the like. Furthermore, a mount pattern, for example, may be a mount pattern for task management. Specifically, a region for drawing an icon such as a name or a portrait (a photograph may be included) of a conference participant (may be a person who can be a person-in-charge of a task to be done) is determined in advance, and at the time when the conference participant or group members who constitute the target organization are determined, the name or the portrait may be drawn. In the creation date and time field 520, the creation date and time of the mount are stored. In the creator field 525, a creator of the mount is stored.

FIG. 6 is a diagram illustrating an example of a data structure of a region and person-in-charge allocation table 600. The region and person-in-charge allocation table 600 is stored in the information processing apparatus 100. The region and person-in-charge allocation table 600 includes a mount ID field 610, a number-of-regions field 615, a region field 620, and a person-in-charge field 645, and the region field 620 includes an X field 625, an Y field 630, a W field 635, and an H field 640. In the mount ID field 610, a mount ID is stored. In the number-of-regions field 615, the number of regions to be allocated to the person-in-charge is stored. In the region field 620, definition of the region is stored. In the X field 625, the X coordinate of the region is stored. In the Y field 630, the Y coordinate of the region is stored. In the W field 635, the W (that is, the width) of the region is stored. In the H field 640, the H (that is, height) of the region is stored. In the person-in-charge field 645, the person-in-charge is stored. A set of the region field 620 and the person-in-charge field 645 continues by the number in the number-of-regions field 615, following the number-of-regions field 615.

FIG. 7 is a diagram illustrating an example of a data structure of a sticky note information table 700. The sticky note information is information including the attributes of the sticky note, and the sticky note information table 700 is a table of the sticky note attributes. The sticky note information table 700 is stored in the information processing apparatus 100. The sticky note information table 700 includes a sticky note ID field 710, a mount ID field 712, an attachment position field 715, a size field 720, a creation date and time field 725, a creator field 730, an attachment date and time field 735, a color field 740, a frame line shape field 745, a frame line color field 750, a frame line thickness field 755, a belonging group field 760, a type field 765, a contents type field 770, and a contents field 775. Information on each field of the tables corresponds to each attribute of the sticky note. A sticky note ID is stored in the sticky note ID field 710. A mount ID to which the sticky note is attached is stored in the mount ID field 712. In the attachment position field 715, a position (for example, the position of a center of the sticky note, an upper left end, and the like) to which the sticky note is attached is stored. That is, in the attachment position field, an attachment position on the mount is stored. For example, the attachment position is stored in coordinates in an XY coordinate system of the mount. In the size field 720, the size of the sticky note is stored. For example, when a sticky note that is presented is a rectangular shape, the width and height are stored. In the creation date and time field 725, a date and time at the time of creating the sticky note are stored. In the creator field 730, the creator (that is, a creator ID) of the sticky note is stored. Alternatively, the information processing apparatus in which the sticky note is created (for example, a device ID of the user terminal 220 or the information processing apparatus 100) may be stored. In the attachment date and time field 735, a date and time at the time of attaching the sticky note to a mount are stored. In the color field 740, the display color of the sticky note is stored. In the frame line shape field 745, the shape (for example, a solid line, a dotted line, a broken line, a wavy line, and a double line, and the like) of a frame line of the displayed sticky note is stored. In the frame line color field 750, the color of the frame line of the displayed sticky note is stored. In the frame line thickness field 755, the thickness of the frame line of the displayed sticky note is stored. In the belonging group field 760, information on a group to which the sticky note belongs is stored. For example, information indicating whether the sticky note belongs to a group may be stored. When the sticky note belongs to the group, the group ID, another sticky note ID belonging to the group, or the like may be stored. In the type field 765, a type of the sticky note (that is, a type) is stored. Specifically, there are a ToDo type in which that a task to be done is described and a normal type (sticky notes other than the ToDo type, which are general sticky notes used for a conference). In the contents type field 770, contents type of the sticky note (a vector data indicating text information, a handwritten character, a graphic, or the like, voice information, still image information such as a photograph and the like, moving image information, or information indicating a combination thereof) is stored. In the contents field 775, the contents written in the sticky note is stored. Specifically, at least "a task to be done" is described in a ToDo-type sticky note. Additionally, the person-in-charge and the progress status may be described. Also, the person-in-charge described in the sticky note may cause the sticky note screen generation module 115 to describe the person-in-charge allocated by the allocation module 125 (that is, the person-in-charge corresponding to the attachment position).

FIG. 8 is a diagram illustrating an example of a data structure of a ToDo management table 800. The ToDo management table 800 is stored in the information processing apparatus 100. The ToDo management table 800 includes a ToDo ID field 810, a ToDo field 815, a person-in-charge field 820, a deadline field 825, a progress status field 830, and a sticky note ID field 835. In the ToDo ID field 810, information for uniquely identifying the ToDo (as a specific example, a ToDo ID) is stored in the present exemplary embodiment. In the ToDo field 815, the ToDo (that is, a task to be done) is stored. In the person-in-charge field 820, the person-in-charge of the ToDo is stored. In the deadline field 825, a deadline (for example, a due date) in the ToDo is stored. In the progress status field 830, a progress status in the ToDo is stored. In the sticky note ID field 835, a sticky note ID in which the ToDo is described is stored. The ToDo is associated with the sticky note by the ToDo management table 800.

Figure 9:
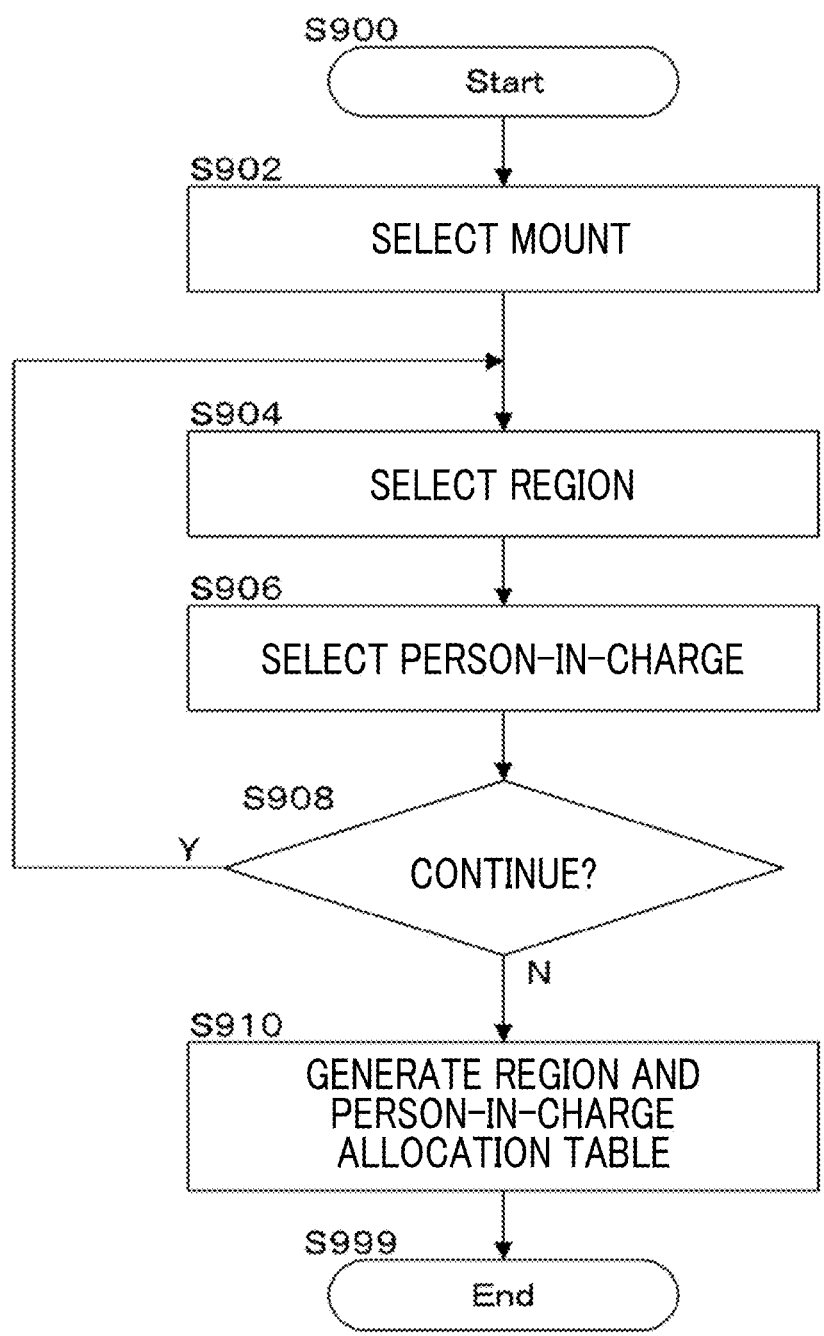
FIG. 9 is a flowchart illustrating a processing example according to the present exemplary embodiment.

FIG. 9 is a flowchart illustrating a processing example according to the present exemplary embodiment.

In step S902, a mount is selected. For example, the mount is selected in accordance with a user's operation.

In step S904, a region is selected. For example, the region on the mount is selected in accordance with the user's operation. More specifically, the user draws a rectangle and the like, and a target region is selected.

In step S906, a person-in-charge is selected. For example, the person-in-charge of the region is selected in accordance with the user's operation. More specifically, a person-in-charge list may be displayed and a person-in-charge in the person-in-charge list may be selected.

In step S908, it is determined whether to continue. In the case of continuing, the processing proceeds to step S910, and otherwise, the processing returns to step S904. For example, it is determined in accordance with a user's ending operation or a user's continuous operation.

In step S910, the region and person-in-charge allocation table 600 is generated. Specifically, the region selected in step S904 is associated with the person-in-charge selected in step S906.

Figure 10:
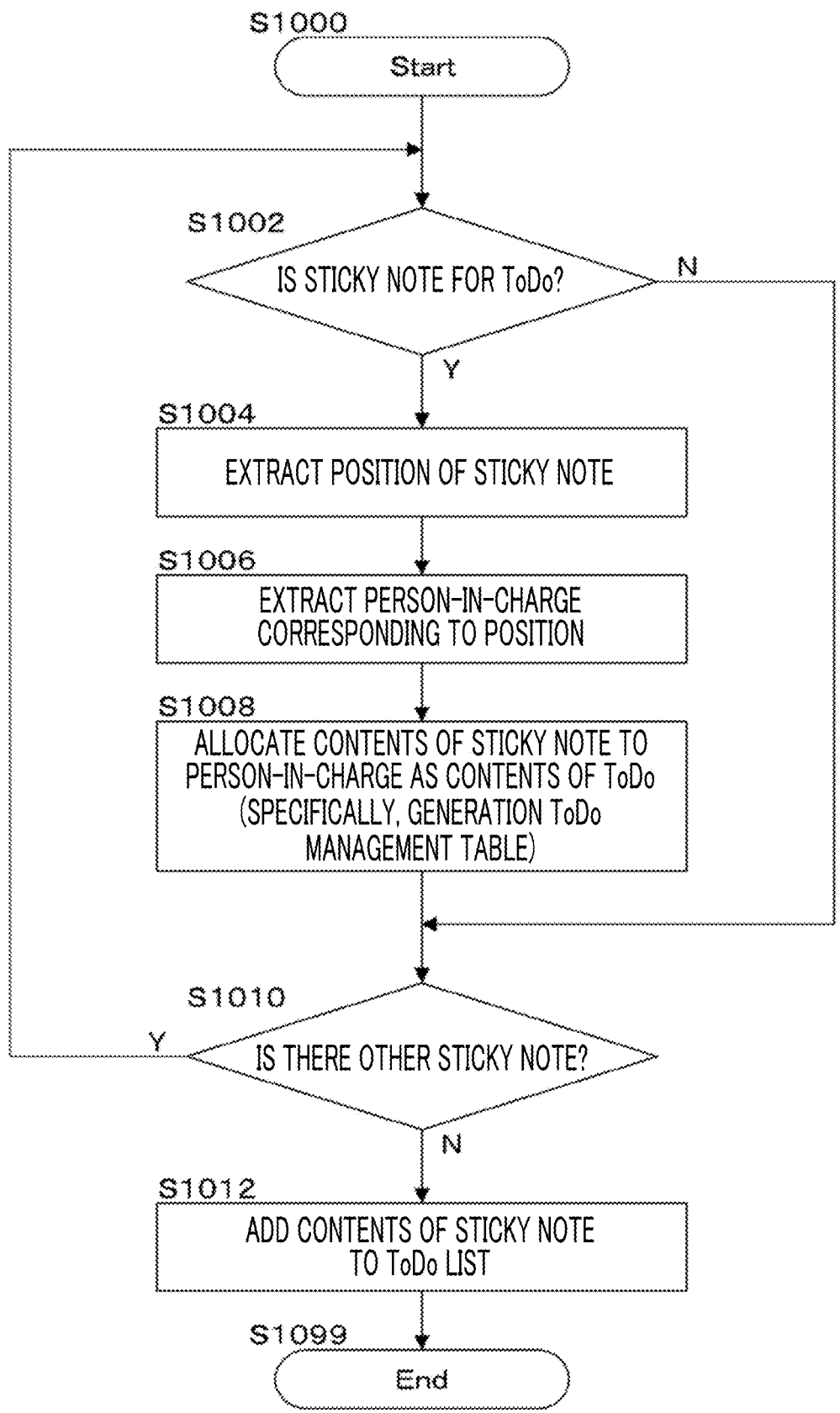
FIG. 10 is a flowchart illustrating a processing example according to the present exemplary embodiment.

FIG. 10 is a flowchart illustrating a processing example according to the present exemplary embodiment.

In step S1002, it is determined whether the sticky note is a sticky note for a ToDo. When it is the sticky note for the ToDo, the processing proceeds to step S1004, and otherwise, the processing proceeds step S1010. Specifically, the type field 765 of the sticky note as a target of the sticky note information table 700 may be verified.

In step S1004, a position of the sticky note is extracted. Specifically, the attachment position field 715 of the sticky note as a target of the sticky note information table 700 may be extracted.

In step S1006, a person-in-charge corresponding to the position is extracted. Specifically, a person-in-charge in the person-in-charge field 645 who is associated with a region in the region field 620 in the region and person-in-charge allocation table 600 including the position extracted in step S1004 may be extracted.

In step S1008, contents of the sticky note is allocated to the person-in-charge as contents of the ToDo. Specifically, the ToDo management table 800 is generated.

In step S1010, it is determined whether there is another sticky note. When there is another sticky note, the processing returns to step S1002, and otherwise, the processing proceeds to step S1012.

In step S1012, contents of the sticky note (which includes at least a task to be done and may include a deadline and the like) is added to a ToDo list screen (an example of the progress screen) of the person-in-charge. The ToDo list screen will be described later using the example of FIG. 13B.

Figure 11:
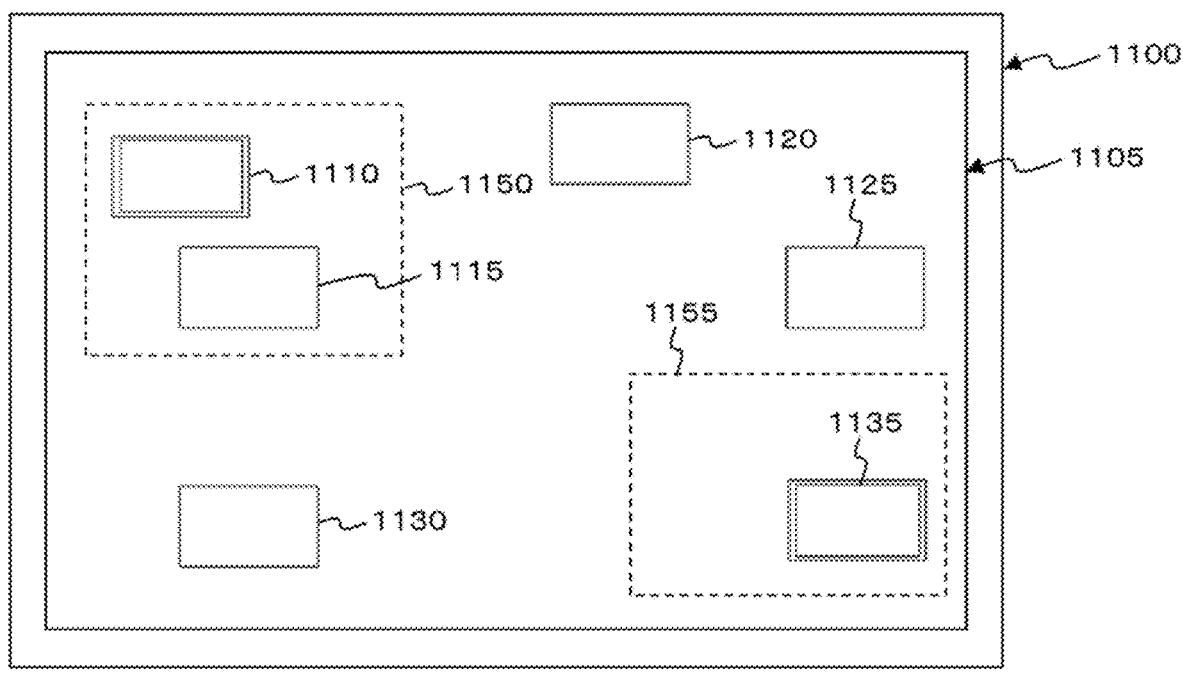
FIG. 11 is a diagram illustrating a processing example according to the present exemplary embodiment.

FIG. 11 is a diagram illustrating a processing example according to the present exemplary embodiment.

A mount 1105 is displayed in a screen 1100.

A region 1150 of a person-in-charge A, and a region 1155 of a person-in-charge B are set in accordance with a user's operation.

A sticky note 1110, a sticky note 1115, a sticky note 1120, a sticky note 1125, a sticky note 1130, and a sticky note 1135 are attached in the mount 1105. The screen 1100 displaying the mount 1105 and the sticky note 1110 attached in the mount, and the like is an example of a sticky note screen.

The sticky note 1110 and the sticky note 1115 are attached in the region 1150 of the person-in-charge A. The sticky note 1135 is attached in the region 1155 of the person-in-charge B. A ToDo is set in the sticky note 1110 and the sticky note 1135. The other sticky notes are regular sticky notes.

Since the sticky note 1110 is attached to the region 1150 of the person-in-charge A and the sticky note 1135 is attached to the region 1155 of the person-in-charge B, the information processing apparatus 100 allocates contents of the ToDo of the sticky note 1110 to the person-in-charge A and allocates contents of the ToDo of the sticky note 1135 to the person-in-charge B.

Figure 12:
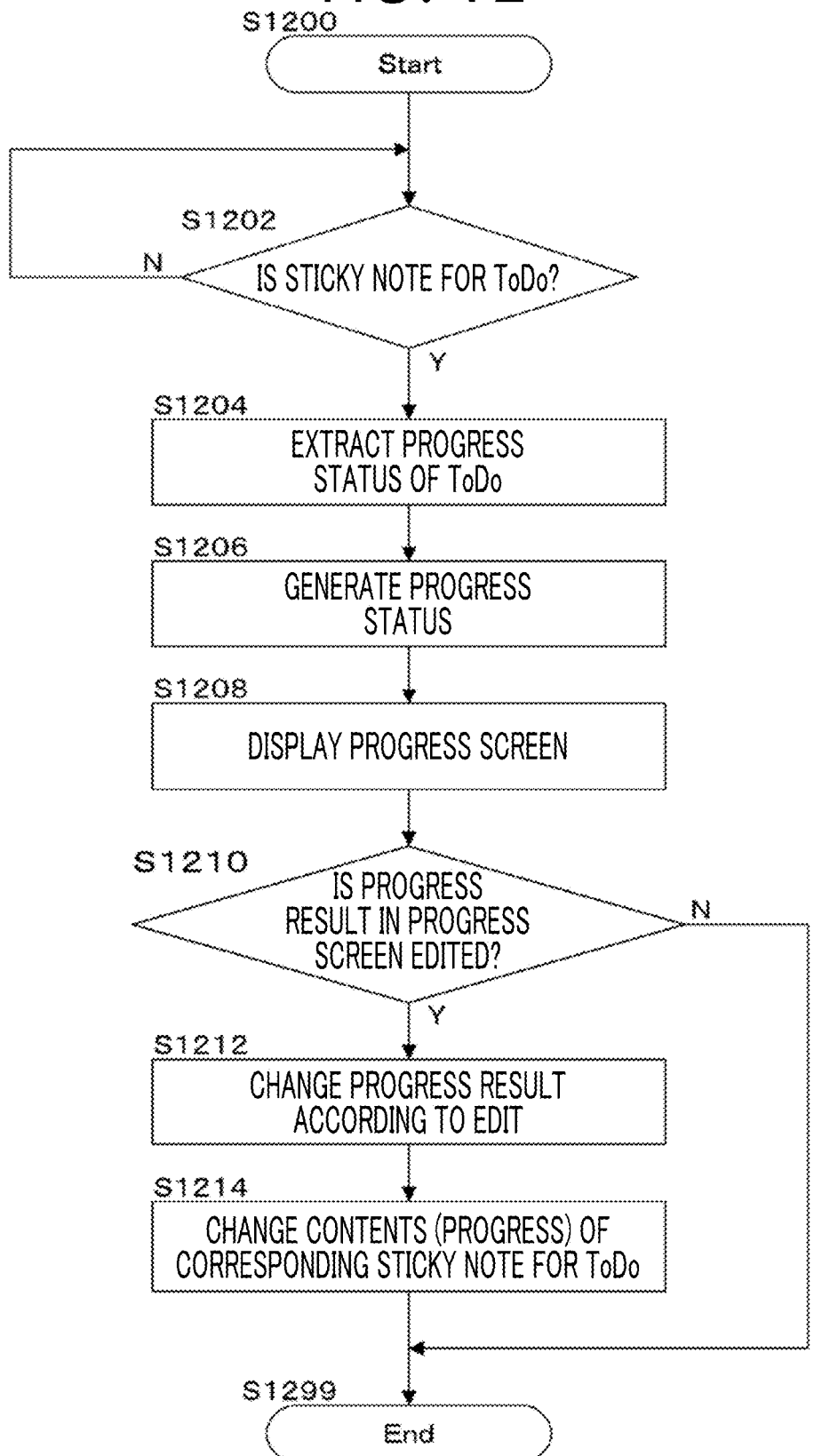
FIG. 12 is a flowchart illustrating a processing example according to the present exemplary embodiment.

FIG. 12 is a flowchart illustrating a processing example according to the present exemplary embodiment.

In step S1202, it is determined whether the target sticky note is a sticky note for a ToDo. When the target sticky note is the sticky note for the ToDo, the processing proceeds to step S1204, and otherwise, the processing waits until the sticky note for the ToDo becomes a target. For example, by a user selecting the sticky note, the sticky note becomes the target sticky note.

In step S1204, a progress status of the ToDo is extracted. Specifically, the progress status is extracted from the progress status field 830 of the ToDo management table 800.

In step S1206, a progress screen is generated. For example, a time chart displaying a progress status is generated.

In step S1208, the progress screen generated in step S1206 is displayed.

In step S1210, it is determined whether a progress result on the progress screen is edited. When it is edited, the processing proceeds to step S1212, and otherwise, the processing ends (step S1299). Here, the "progress result" is an index that represents a progress status (that is, the degree of progress), and may be binary values of "not completed" or "completed", or may represent the progress status in more detail. For example, even without operating the ToDo list, the person-in-charge can report the progress result by editing the progress result on the progress screen displayed on the screen.

In step S1212, the progress result on the progress screen is changed according to editing.

In step S1214, contents (progress) of the corresponding sticky note for the ToDo is changed. Specifically, the detail of the progress status field 830 of the ToDo management table 800 is changed. Furthermore, other attributes of the sticky note may be changed according to the progress result. Particularly, as the attribute changed according to the progress result, it is desirable to use the attribute (for example, color and the like) relating to the displayed sticky note. As a specific example, when the progress result is changed from "not completed" to "completed", the color of the sticky note may be changed from red to white.

Figures 13A, 13B:
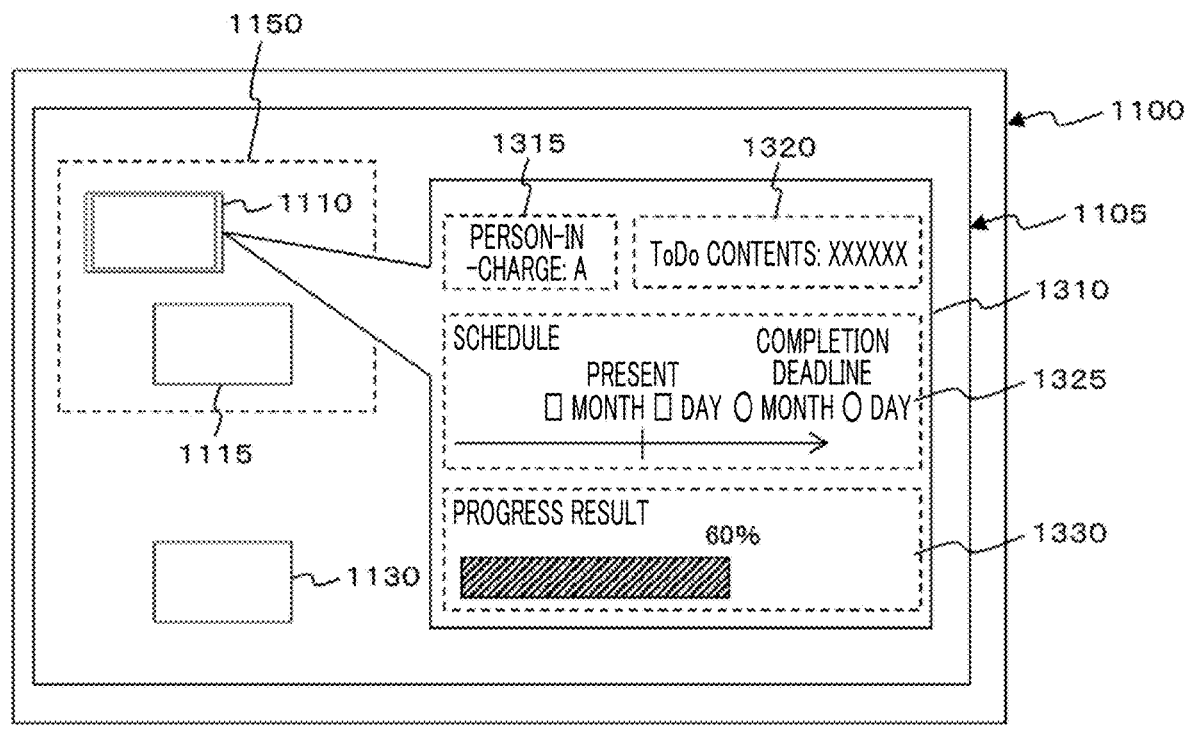
FIGS. 13A and 13B are diagrams illustrating a processing example according to the present exemplary embodiment.

FIGS. 13A and 13B are diagrams illustrating a processing example according to the present exemplary embodiment.

The example of FIG. 13A shows a case where the sticky note 1110 is selected as a target, and a progress display region 1310 is displayed as a pop-up window.

In the progress display region 1310, a person-in-charge region 1315, a ToDo display region 1320, a schedule display region 1325, and a progress result display region 1330 are displayed.

In the progress result display region 1330, a progress result graph is displayed to be editable. The progress result graph is edited by an operation of the person-in-charge (a user A in the example of FIGS. 13A and 13B). For example, it is possible to change the progress result from 60% to 80%. Also, the change is reflected in the contents of the sticky note 1110 (at least the description part of the progress result). Furthermore, the information displayed in the progress display region 1310 may be acquired from the task management apparatus 200 or the user terminal 220 which manages a task to be done.

The example in FIG. 13B shows the case where a ToDo list 1355 is displayed on a ToDo list screen 1350. The ToDo list screen 1350 is displayed on a display apparatus in the task management apparatus 200 or the user terminal 220. As shown in the example of FIG. 13A, the display is not superimposed on the sticky note screen, but is displayed separately from the sticky note screen (even though the sticky note screen is closed). Also, in the example, the ToDo list is displayed separately from the sticky note screen, but is provided by the information processing apparatus 100. For example, there are a sticky note conference function and a task management function for managing a ToDo list in the "task support service X" provided by company A, and a screen A corresponding to the sticky note conference function and, a screen B corresponding to the task management function, which are provided separately from the screen A, may be displayed.

The ToDo list 1355 includes a person-in-charge field 1360, a ToDo contents field 1365, a schedule field 1370, and a progress result field 1375. In the person-in-charge field 1360, a person-in-charge of a task to be done is stored. In the ToDo contents field 1365, contents of the task to be done is stored. In the schedule field 1370, a schedule of the task to be done is stored. In the progress result field 1375, a progress result of the task to be done is stored.

For example, in FIG. 13B, a task to be done of a person-in-charge A is "XXXXXX", the schedule of the task to be done is "completion deadline: ○ month ○ day", and it is indicated that the progress result by the person-in-charge A is "60%".

Also, when a user operates progress on the ToDo list 1355 in the task management apparatus 200 or the user terminal 220, a corresponding sticky note is displayed with a status updated on the ToDo list 1355 the next time the sticky note screen is opened.

Figure 14A:
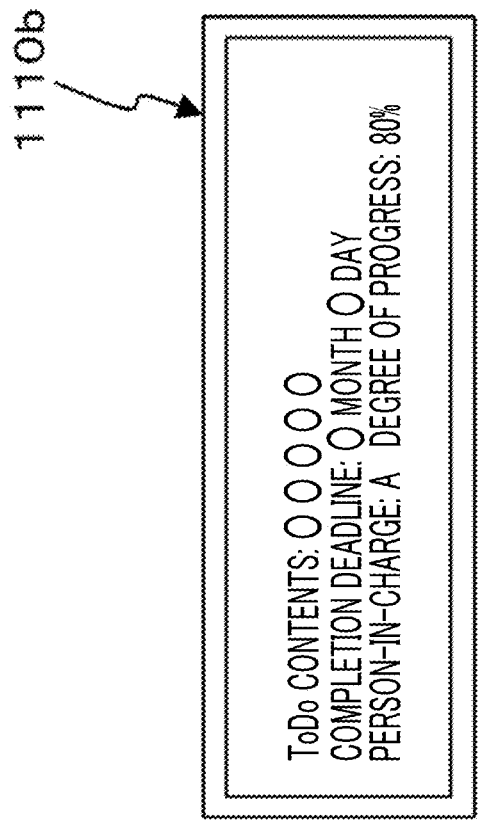
FIGS. 14A and 14B are diagrams illustrating processing examples according to the present exemplary embodiment.
Figure 14B:
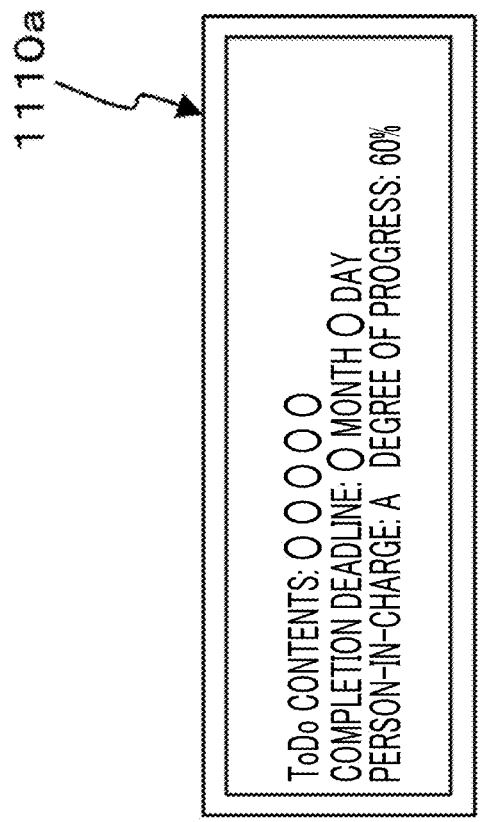

FIGS. 14A and 14B are diagrams illustrating processing examples according to the present exemplary embodiment.

In the progress result display region 1330 shown in the example of FIGS. 13A and 13B, an example when the progress result is changed from 60% to 80% is shown. That is, the contents of the sticky note 1110 is changed from a sticky note 1110a shown in the example of FIG. 14A to a sticky note 1110b shown in the example of FIG. 14B. Specifically, in the sticky note 1110, contents of a ToDo (a task to be done), a completion deadline, a person-in-charge, and a degree of progress are described. Before changing of the detail in the progress result display region 1330, the "degree of progress: 60%" is shown as the sticky note 1110a shown in the example in FIG. 14A, and but after changing of the detail in the progress result display region 1330, the "degree of progress: 80%" is shown as the sticky note 1110b shown in the example of FIG. 14B without editing operation on the sticky note 1110 by a user.

Figure 15:
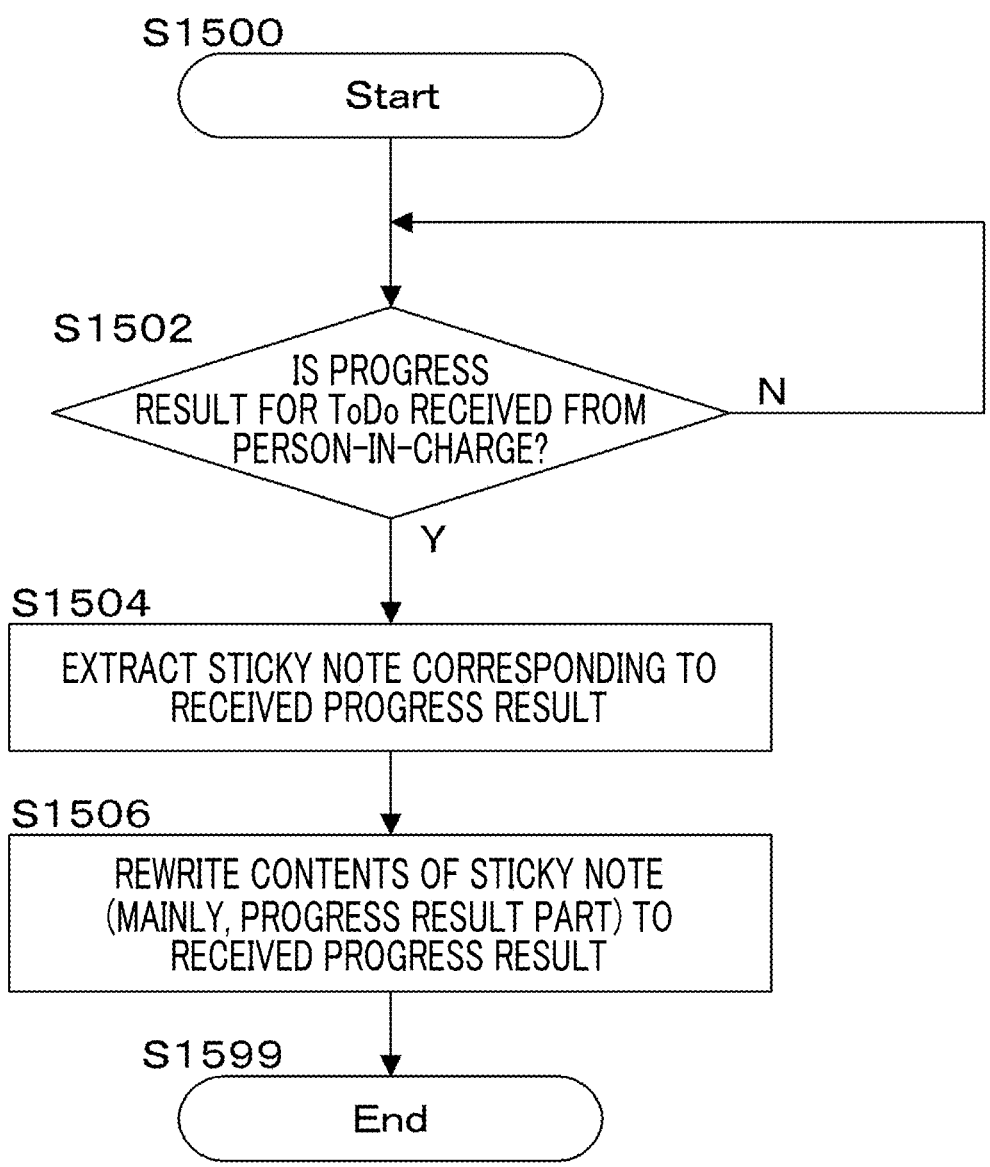
FIG. 15 is a flowchart illustrating a processing example of the present exemplary embodiment.

FIG. 15 is a flowchart illustrating a processing example of the present exemplary embodiment.

In step S1502, it is determined whether the progress result for a ToDo is received from a person-in-charge. In the case where the progress result is received, the processing proceeds to step S1504, and otherwise, the processing waits until receiving the progress result. Specifically, a progress result at the time point (more specifically, the contents of the ToDo management table 800) is received from the user terminal 220 possessed by the person-in-charge or the task management apparatus 200 managing a ToDo of the person-in-charge.

In step S1504, a sticky note corresponding to the received progress result is extracted. Specifically, a sticky note ID may be extracted from the sticky note ID field 835 of the ToDo management table 800.

In step S1506, the contents of the sticky note (mainly the progress result part) is rewritten to the received the progress result.

Figure 16:
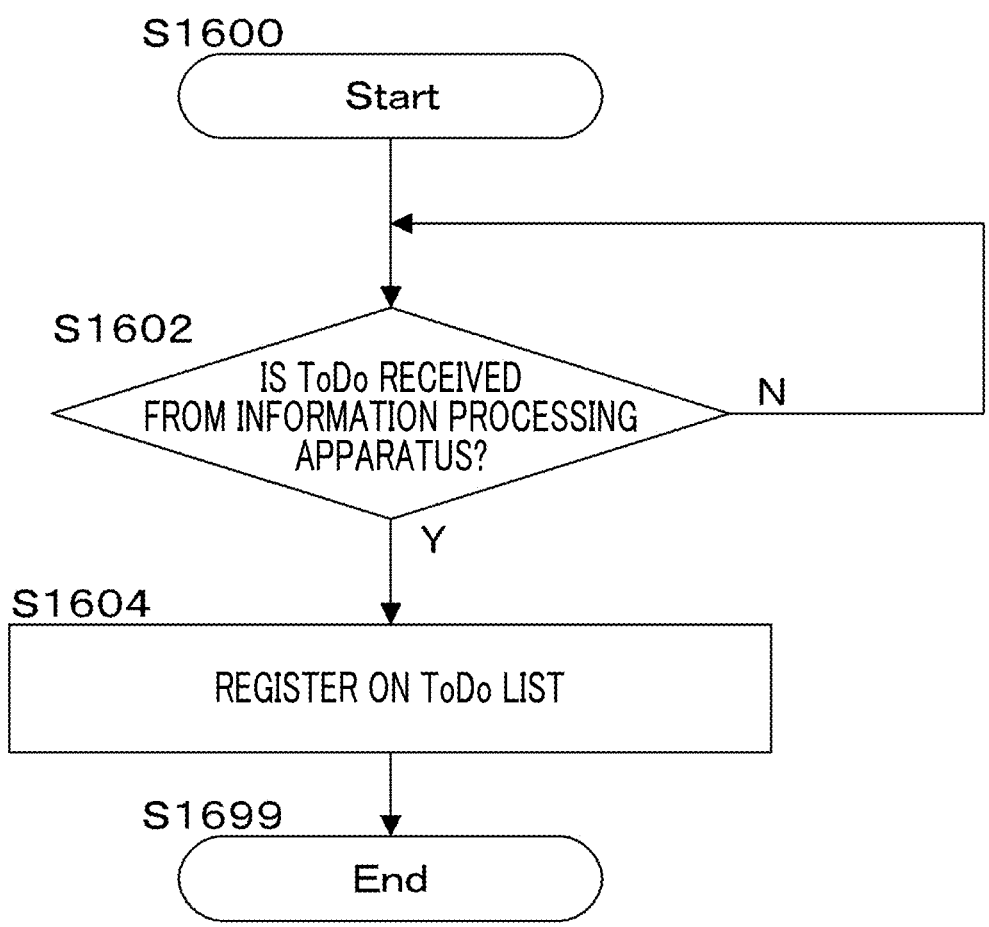
FIG. 16 is a flowchart illustrating a processing example of the present exemplary embodiment.

FIG. 16 is a flowchart illustrating a processing example of the present exemplary embodiment. The processing example is performed by the user terminal 220 or the task management apparatus 200 having the task management module 205.

In step S1602, it is determined whether a ToDo (more specifically, the contents of the ToDo management table 800) is received from the information processing apparatus 100. In the case of receiving the ToDo, the processing proceeds to step S1604, and otherwise, the processing waits until receiving the ToDo.

In step S1604, the received ToDo is registered in the managed ToDo list.

Figure 17:
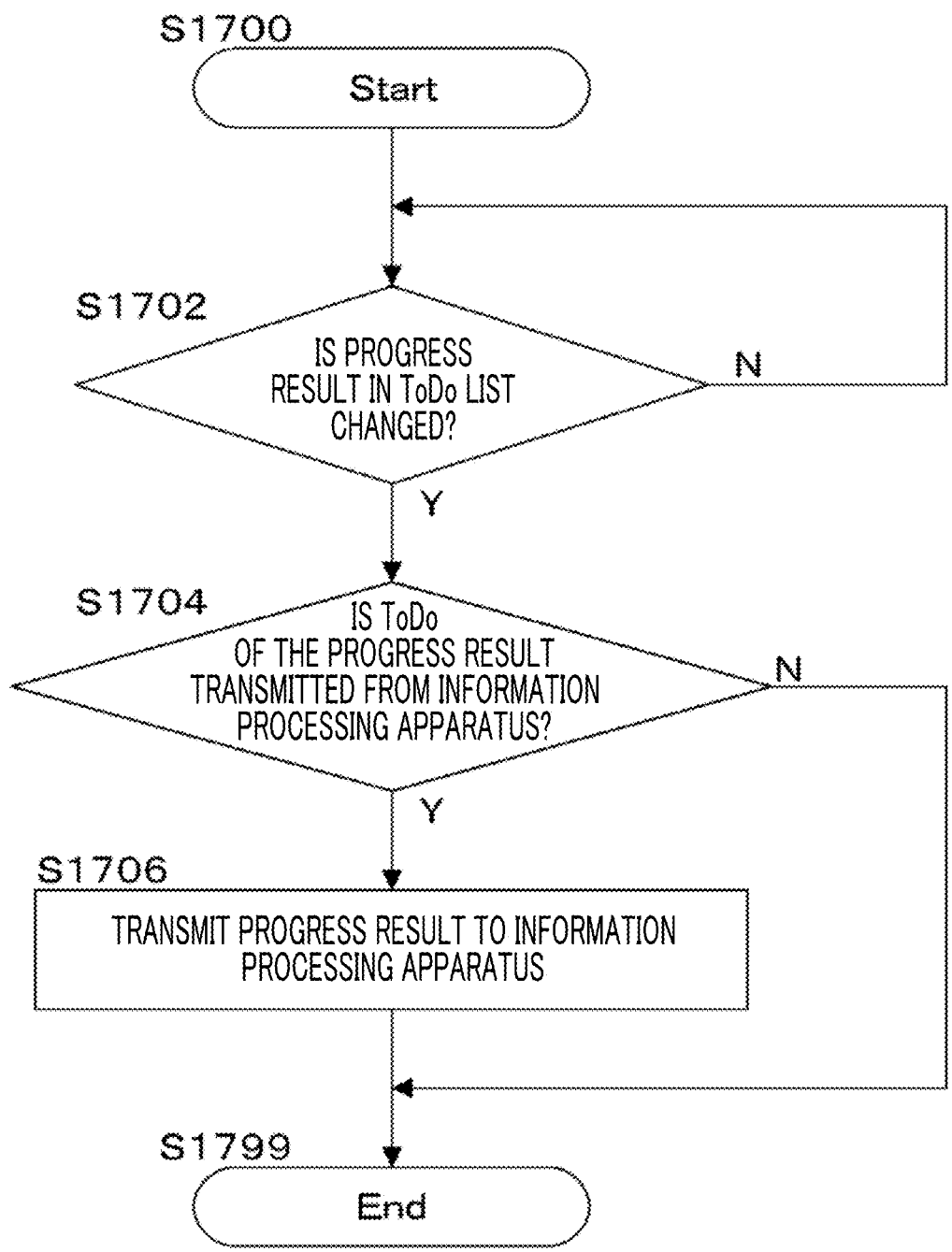
FIG. 17 is a flowchart illustrating a processing example of the present exemplary embodiment.

FIG. 17 is a flowchart illustrating a processing example of the present exemplary embodiment. The processing example is performed by the user terminal 220 or the task management apparatus 200 having the task management module 205.

In step S1702, it is determined whether the progress result in a ToDo list is changed on the user terminal 220 or the task management apparatus 200. In the case where the progress result in a ToDo list is changed, the processing proceeds to step S1704, and otherwise, the processing waits until the change is performed.

In step S1704, it is determined whether the ToDo of the progress result is transmitted from the information processing apparatus 100. When it is transmitted from the information processing apparatus 100, the processing proceeds to step S1706, and otherwise, the processing ends (step S1799). Specifically, it is determined whether the sticky note is a ToDo associated therewith.

In step S1706, a changed progress result is transmitted to the information processing apparatus 100 transmitting the target ToDo.

In step S1012 of FIG. 10, although contents of the ToDo is added to the ToDo list, a message including the contents of the ToDo may be transmitted to the person-in-charge of the ToDo. In this case, the sticky note corresponding to the message may be updated by receiving a reply to the message. As the simplest example, it is conceivable to update the sticky note by receiving the reply. In this case, in a case of receiving the reply, the progress status indicated by the sticky note is updated from "not completed" to "completed".

Also, the determination as to whether the sticky note should be updated may be changed and it may be changed how much the degree of the progress status is changed, depending on the contents or attribute of the returned message. For example, when "no progress" is described as the contents of the message, the corresponding sticky note is not updated. When "completed" is described as the contents of the message, the progress status indicated by the corresponding sticky note is updated from "not completed" to "completed".

When a mount is used as a drawing, a component and person-in-charge allocation table 1800 may be used instead of the region and person-in-charge allocation table 600.

Figure 18:
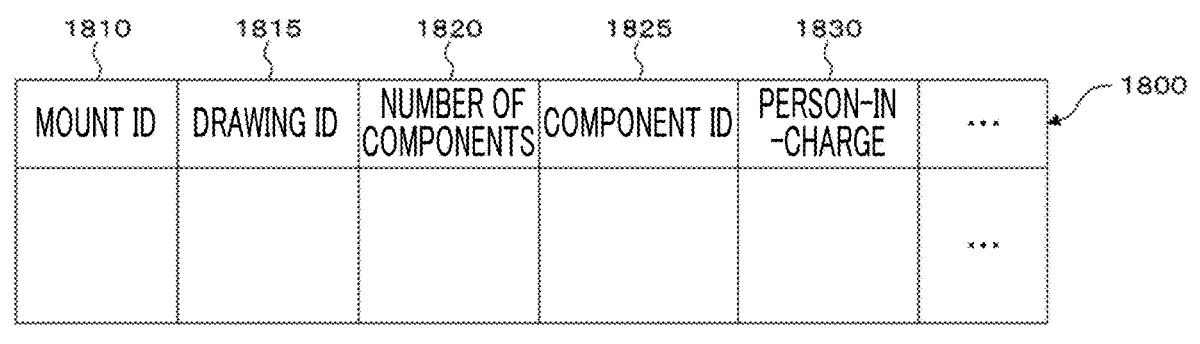

FIG. 18 is a diagram illustrating an example of a data structure of the component and person-in-charge allocation table 1800. The component and person-in-charge allocation table 1800 includes a mount ID field 1810, a drawing ID field 1815, a number-of-components field 1820, a component ID field 1825, and a person-in-charge field 1830. In the mount ID field 1810, a mount ID is stored. In the drawing ID field 1815, a drawing ID of a drawing displayed as the mount is stored. In the number-of-components field 1820, the number of components in the drawing is stored. In the component ID field 1825, a component ID is stored. In the person-in-charge field 1830, the person-in-charge of the component of the component ID is stored. A set of the component ID field 1825 and the person-in-charge field 1830 continues by the number in the number-of-components field 1820, following the number-of-components field 1820. That is, in the component and person-in-charge allocation table 1800, a person-in-charge is associated with each component.

Figure 19:
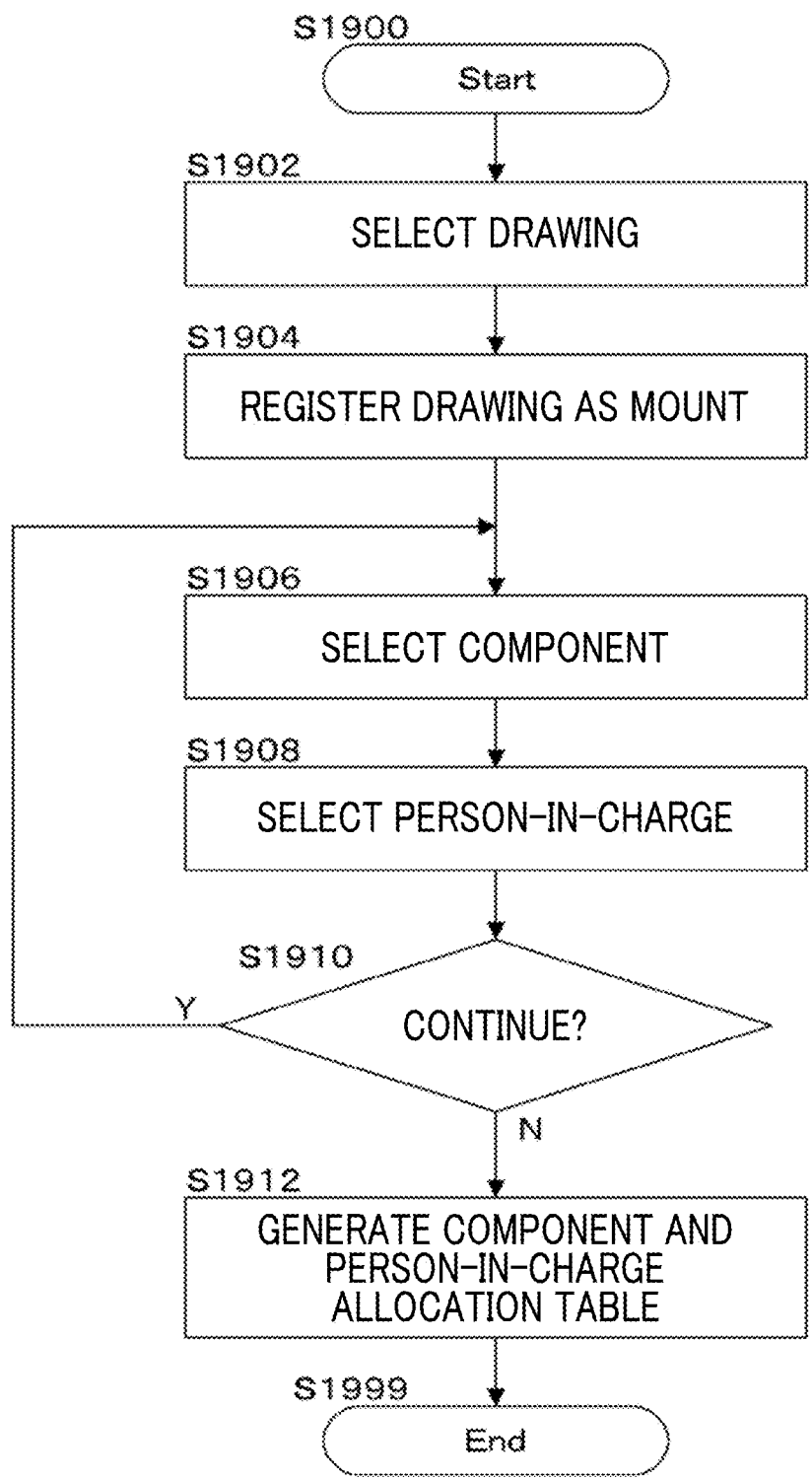
FIG. 19 is a flowchart illustrating a processing example according to the present exemplary embodiment.

FIG. 19 is a flowchart illustrating a processing example according to the present exemplary embodiment. When a mount is used as a drawing, a processing example performed instead of FIG. 9 is shown.

In step S1902, a drawing is selected. For example, the drawing is selected in accordance with a user's operation.

In step S1904, the drawing is registered as a mount.

In step S1906, a component is selected. For example, the component (which may be one component or plural components) on the mount (drawing) is selected in accordance with a user's operation.

In step S1908, a person-in-charge is selected. For example, the person-in-charge of the component is selected in accordance with a user's operation. More specifically, a person-in-charge list may be displayed and a person-in-charge in the person-in-charge list may be selected.

In step S1910, it is determined whether to continue. In the case of continuing, the processing proceeds to step S1912, and otherwise, the processing returns to step S1906. For example, it is determined in accordance with a user's ending operation or a user's continuous operation.

In step S1912, the component and person-in-charge allocation table 1800 is generated. Specifically, the component selected in step S1906 is associated with the person-in-charge selected in step S1908.

Figure 20:
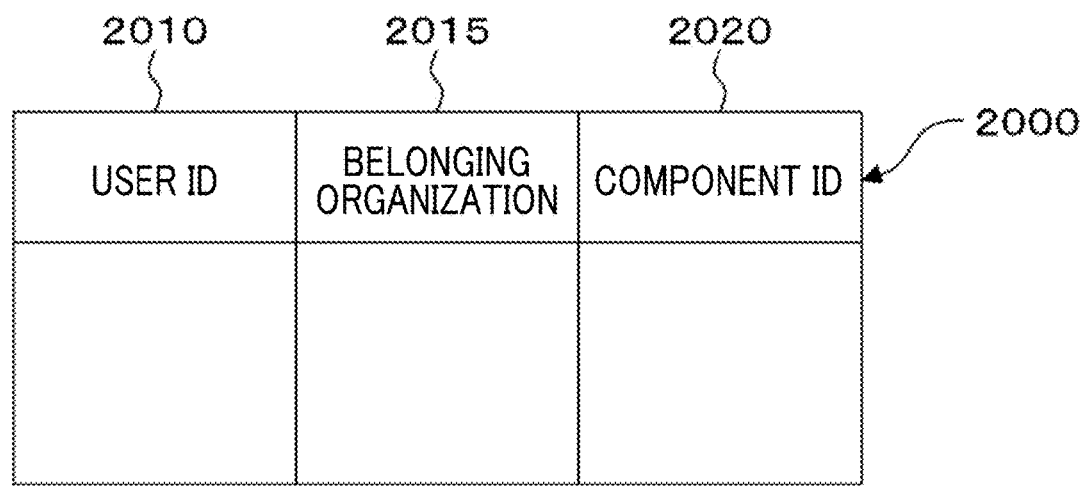
FIG. 20 is a diagram illustrating an example of a data structure of a user management table.

FIG. 20 is a diagram illustrating an example of a data structure of a user management table 2000. The user management table 2000 is stored in the information processing apparatus 100. The user management table 2000 includes a user ID field 2010, a belonging organization field 2015, and a component ID field 2020. In the user ID field 2010, a user ID is stored. In the belonging organization field 2015, a belonging organization of a user is stored. In the component ID field 2020, the component ID of the component of which the user or the organization is in charge is stored. In the user management table 2000, the component is associated with the user or the organization.

Figure 21:
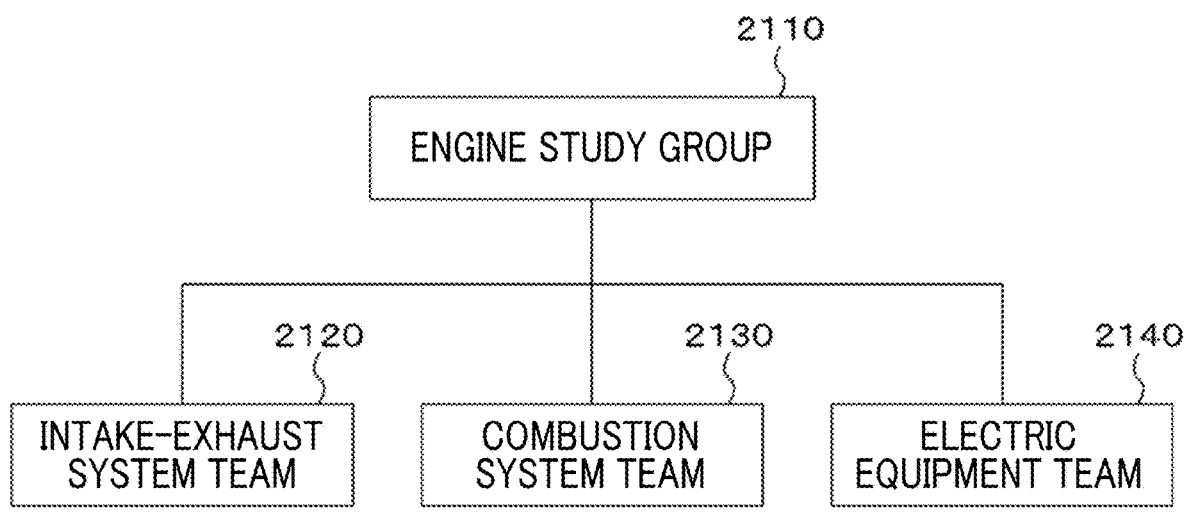
FIG. 21 is a diagram illustrating an example of a data structure of an organization.

FIG. 21 is a diagram illustrating an example of a data structure of an organization. Here, an example of a tree structure is shown as the data structure of the organization.

In the example of FIG. 21, there are an intake-exhaust system team 2120, a combustion system team 2130, and an electric equipment team 2140 at a lower level of an engine study group 2110.

For example, when a drawing of an engine is used as a mount, a ToDo sticky note of a component regarding an intake-exhaust system is associated with the intake-exhaust system team 2120, a ToDo sticky note of a component regarding a combustion system is associated with the combustion system team 2130, and a ToDo sticky note of a component regarding an electric equipment is associated with the electric equipment team 2140.

Figure 22:
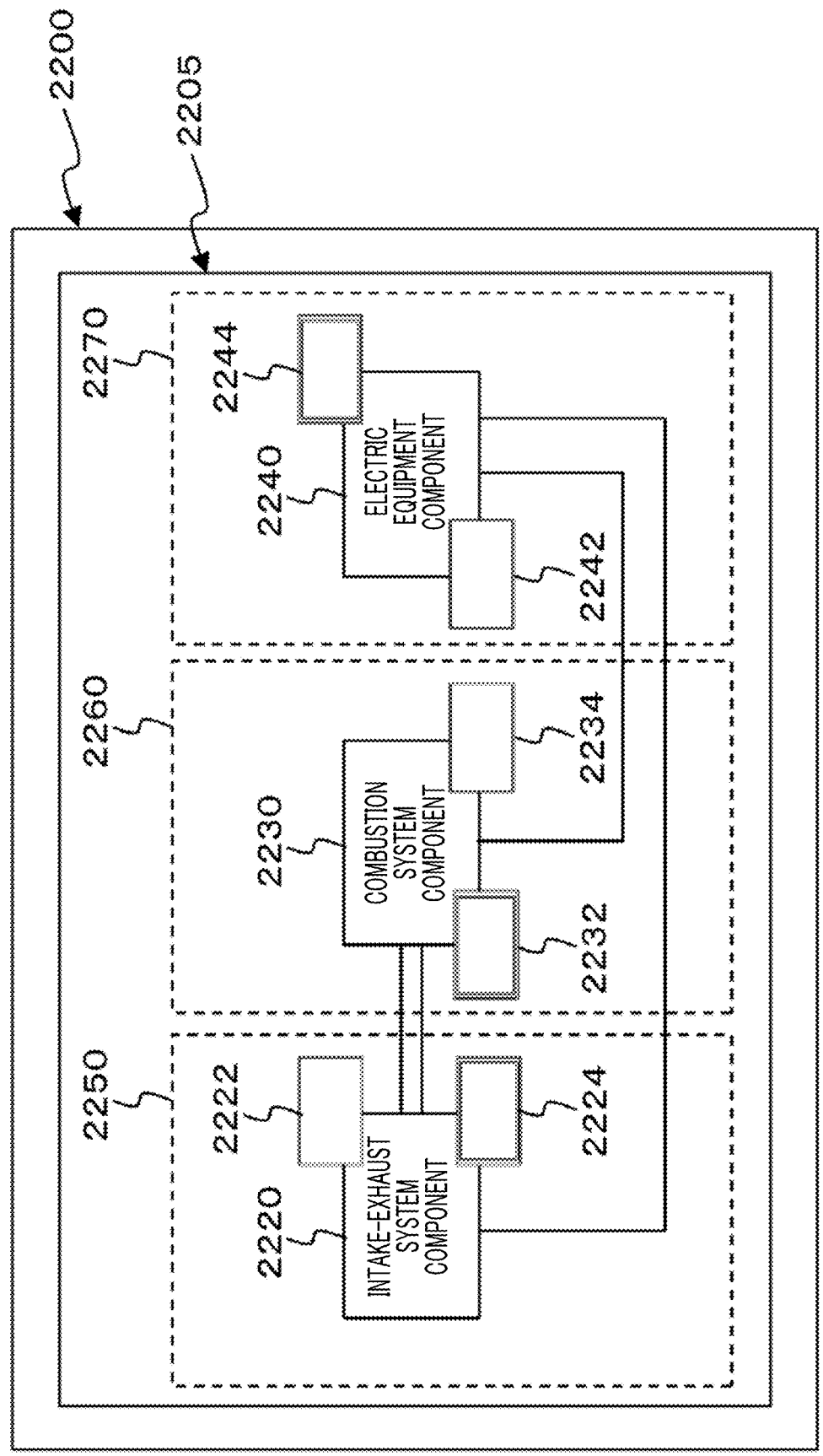
FIG. 22 is a diagram illustrating a processing example according to the present exemplary embodiment.

FIG. 22 is a diagram illustrating a processing example according to the present exemplary embodiment.

A mount 2205 is displayed on a screen 2200.

An intake-exhaust system component 2220, a combustion system component 2230, and an electric equipment component 2240 are described in the mount 2205. The above-mentioned components are described not on a sticky note but on the mount 2205. In other words, a design drawing in which the intake-exhaust system component 2220, the combustion system component 2230, and the electric equipment component 2240 are described is adopted for the mount 2205.

An intake-exhaust system component region 2250 is set to be in charge of the intake-exhaust system team 2120, a combustion system component region 2260 is set to be in charge of the combustion system team 2130, and an electric equipment component region 2270 is set to be in charge of the electric equipment team 2140. This setting may be set in accordance with an organization chart shown in the example of FIG. 21 or may be set in accordance with a user's operation.

The intake-exhaust system component region 2250 is displayed to surround the intake-exhaust system component 2220, and a sticky note 2222 and a sticky note 2224 are attached to the intake-exhaust system component 2220.

The combustion system component region 2260 is displayed to surround the combustion system component 2230, and a sticky note 2232 and a sticky note 2234 are attached to the combustion system component 2230.

The electric equipment component region 2270 is displayed to surround the electric equipment component 2240, and a sticky note 2242 and a sticky note 2244 are attached to the electric equipment component 2240.

ToDos are set in the sticky note 2224, the sticky note 2232, and the sticky note 2244. In this case, contents of the sticky note 2224 is allocated to the intake-exhaust system team 2120 as a ToDo, contents of the sticky note 2232 is allocated to the combustion system team 2130 as a ToDo, and contents of the sticky note 2244 is allocated to the electric equipment team 2140 as a ToDo.

Figure 23:
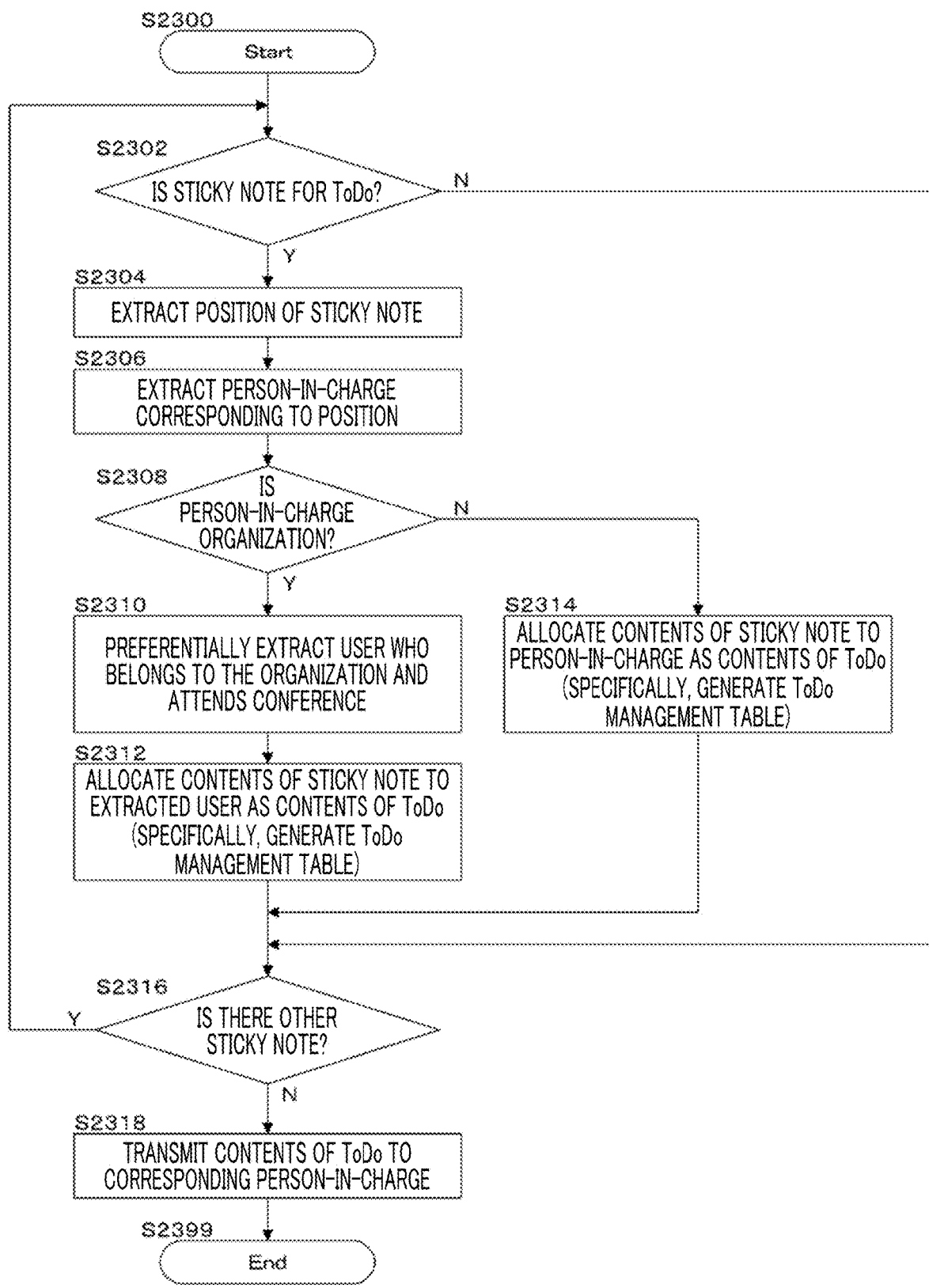
FIG. 23 is a flowchart illustrating a processing example according to the present exemplary embodiment.

FIG. 23 is a flowchart illustrating a processing example according to the present exemplary embodiment. It is an example of processing allocating contents of a ToDo to one person-in-charge when plural persons-in-charge are associated with a position of a mount. Also, a case where an organization is exemplified with regard to the expression "plural persons-in-charge are associated" is shown.

Contents of a ToDo may be allocated according to whether to attend a conference. In an example of processing, the contents of the ToDo is preferentially allocated to the user who attends the conference. That is, although users belong to the same organization, the contents of the ToDo is not allocated to the user who does not attend the conference. However, the pattern may be opposite. That is, the contents of the ToDo may be preferentially allocated to the user who does not attend the conference.

In step S2302, it is determined whether the target sticky note is a sticky note for a ToDo. When it is the sticky note for the ToDo, the processing proceeds to step S2304, and otherwise, the processing proceeds to step S2316.

In step S2304, a position of the sticky note is extracted.

In step S2306, a person-in-charge corresponding to the position is extracted.

In step S2308, it is determined whether the person-in-charge is the organization. When the person-in-charge is the organization, the processing proceeds to step S2310, and otherwise, the processing proceeds to step S2314.

In step S2310, a user who belongs to the organization and attends the conference is preferentially extracted. Specifically, processing of step is performed by using the user management table 2000 and the conference information table 400.

In step S2312, the contents of the sticky note is allocated to the extracted user as the contents of the ToDo. Specifically, the ToDo management table 800 is generated.

In step S2314, the contents of the sticky note is allocated to a person-in-charge as contents of a ToDo. Specifically, the ToDo management table 800 is generated.

In step S2316, it is determined whether there is another sticky note. When there is another sticky note, the processing returns to step S2302, and otherwise, the processing proceeds to step S2318.

In step S2318, contents of a ToDo is transmitted to the corresponding person-in-charge.

Figure 24:
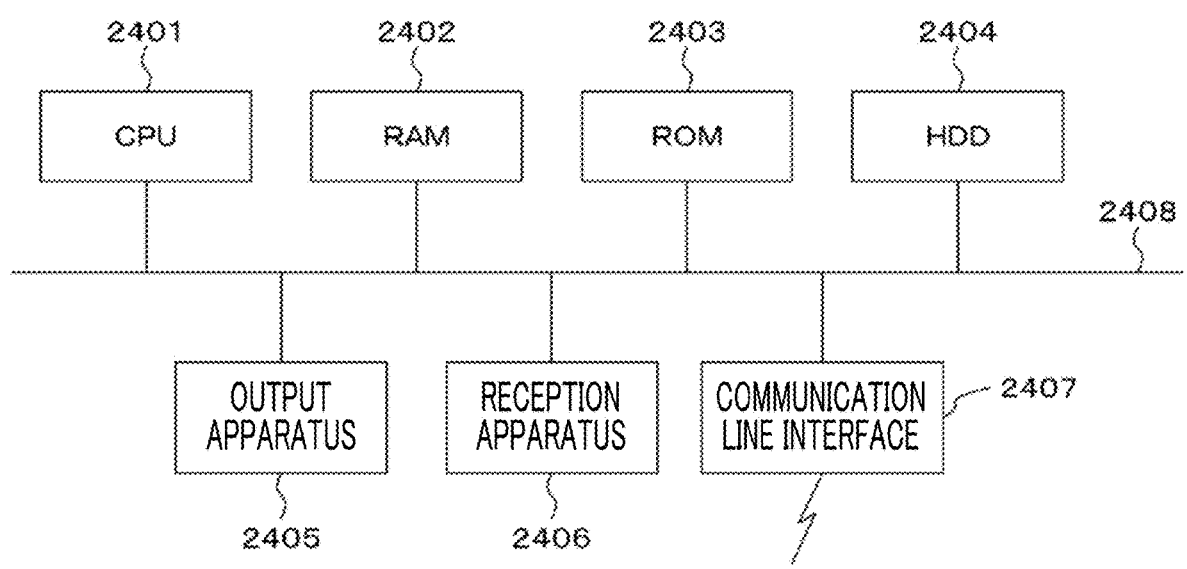
FIG. 24 is a block diagram illustrating a hardware configuration example of a computer for realizing the present exemplary embodiment.

A hardware configuration of a computer executing a program as the present exemplary embodiment is a general computer as illustrated in FIG. 24, and specifically, is a personal computer, a computer that may serve as a server, and the like. That is, as a specific example, a CPU 2401 is used as a processing unit (computational unit), and a RAM 2402, a ROM 2403, and an HDD 2404 are used as a storage apparatus. As the HDD 2404, for example, a hard disk drive (for short, HDD), a solid state drive (for short, SSD) which is a flash memory, and the like may be used. The computer includes the CPU 2401 that executes programs such as the setting module 105, the screen generation module 110, sticky note screen generation module 115, progress screen generation module 120, the allocation module 125, the transmission and reception module 130, the RAM 2402 that stores the program and data, the ROM 2403 that stores programs for starting up the computer, the HDD 2404 that is an auxiliary storage device which stores the conference information table 400, the mount information table 500, the region and person-in-charge allocation table 600, the sticky note information table 700, the ToDo management table 800, the component and person-in-charge allocation table 1800, the user management table 2000 and the like, a reception apparatus 2406 that receives data based on a user's operation (including a motion, a sound, an eye gaze, and the like) for a keyboard, a mouse, a touch screen, a microphone, a camera (including an eye gaze detection camera, and the like), and the like, an output apparatus 2405 such as a CRT, a liquid crystal display, or a speaker, a communication line interface 2407, such as a network interface card, for connection to a communication network, and a bus 2408 for transmitting and receiving data by connecting the above-mentioned components. The plural computers may be connected to each other through a network.

The exemplary embodiment in which the computer program has been described, among the above-described exemplary embodiments, is implemented by causing a system having the hardware configuration to read a computer program which is software, and causing software and hardware resources to cooperate with each other.

The hardware configuration illustrated in FIG. 24 shows one configuration example. The present exemplary embodiment is not limited to the configuration illustrated in FIG. 24, and the hardware may have any configuration as far as modules described in the exemplary embodiments are capable of being executed. For example, some modules may be provided with dedicated hardware (for example, an application specific integrated circuit (for short, ASIC) or a field-programmable gate array (for short, FPGA), and the like), some modules may be provided in an external system and connected to each other through a communication line, or plural systems, each of which is illustrated in FIG. 24, may be connected to each other through a communication link and operated in cooperation with each other. In addition to the personal computer, the hardware may be particularly incorporated into portable information communication equipment, an information appliance, a robot, a copier, a facsimile, a scanner, a printer, a multifunction machine (an image processing apparatus including any two or more of the scanner, the printer, the copying machine, and the facsimile), and the like.

The programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium where the program is stored, which is used for installation, execution, distribution, and the like of the program.

Examples of the recording medium include a digital versatile disc (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disc (CD) having a format of CD read only memory (CD-ROM), CD recordable (CD-R), CD rewritable (CD-RW), or the like, a Blu-ray Disc (registered trademark), a magneto-optical disc (MO), a flexible disc (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The whole or part of the program may be recorded on the recording medium for storage, distribution, and the like. In addition, the program may be transmitted through communication, for example, by using a transmission medium of, for example, a wired network used for a local area network (LAN), a metropolitan area network (MAN), a wide area network (WAN), the Internet, an intranet, an extranet, and the like, a wireless communication network, or a combination thereof. The program may be carried on carrier waves.

Further, the above-described programs may be part or whole of another program, or may be recorded on a recording medium along with a separate program. The program may be recorded on plural recording media in a divided manner. The program may be recorded in any format, such as compression or encryption, as long as it is possible to restore the program.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to
select an arbitrary location in an image;
set a person-in-charge for the arbitrary location in the image;
generate instructions for a sticky note screen displaying the image and a sticky note attached to the image at the arbitrary location in the image; and
in accordance with a position of the sticky note attached to the image, allocate contents of the sticky note to the person-in-charge corresponding to the arbitrary location in the image,
wherein the sticky note comprises a field for arbitrary data and the sticky note and the image are generated by separate applications.

2. The information processing apparatus according to claim 1, wherein the processor is further programmed to:
generate instructions for a progress screen displaying a task to be done, a person-in-charge to do the task, and a progress status in association with each other, and
add the contents to the progress screen as the task to be done in association with the person-in-charge.

3. The information processing apparatus according to claim 2, wherein
the processor is programmed to change the displayed progress status in accordance with a user's input, and
when the progress status on the progress screen is changed by the user's input, the processor is programmed to update a sticky note corresponding to a changed task to be done.

4. The information processing apparatus according to claim 1, wherein
in accordance with the position of the sticky note attached to the image, the processor is programmed to transmit a message including the contents of the sticky note to the person-in-charge corresponding to the position.

5. The information processing apparatus according to claim 4, wherein the processor is programmed to
receive a reply to the message from the person-in-charge, and
update the sticky note corresponding to the contents when the reply is received.

6. The information processing apparatus according to claim 1, wherein
a progress screen generated by an external apparatus displays a task to be done, a person-in-charge to do the task, and a progress status in association with each other, and
the processor is programmed to transmit the contents to the external apparatus so that the transmitted contents are added to the progress screen generated by the external apparatus in association with the person-in-charge.

7. The information processing apparatus according to claim 1, wherein
the processor is programmed to associate persons-in-charge with partial images that are parts of the image, respectively, and
when the sticky note is attached to a partial image, the processor is programmed to allocate the contents of the sticky note to the person-in-charge associated with the partial image as a task to be done.

8. The information processing apparatus according to claim 7, wherein
only when the sticky note has an attribute indicating that the sticky note is an allocation target by the processor, the processor is programmed to allocate the contents of the sticky note to the person-in-charge corresponding to the position.

9. An information processing system comprising:
a first device; and
a second device, wherein
the first device comprises a first processor programmed to
select an arbitrary location in an image
set a person-in-charge for the arbitrary location in the image,
generate instructions for a sticky note screen displaying the image and a sticky note attached to the image at the arbitrary location in the image,
in accordance with a position of the sticky note attached to the image, allocate contents of the sticky note to the person-in-charge corresponding to the arbitrary location in the image, and
generate instructions to transmit an allocation result to the second device, and
the second device comprises a second processor programmed to
receive the allocation result from the first device, and
allocate a task to be done to the person-in-charge in accordance with the allocation result,
wherein the sticky note comprises a field for arbitrary data and the sticky note and the image are generated by separate applications.

10. The information processing system according to claim 9, wherein
the second processor is further programmed to
manage a progress status of the task to be done, and
generate instructions to transmit the progress status of the task to be done to the first device when the progress status is updated, and the first processor is further programmed to
when the progress status of the task to be done is received from the second device, describe the progress status in the sticky note corresponding to the task to be done.

11. A non-transitory computer readable medium storing a program that causes a computer to execute information processing, the information processing comprising:
selecting an arbitrary location in an image;
setting a person-in-charge for the arbitrary location in the image;
generating a sticky note screen displaying the image and a sticky note attached to the image at the arbitrary location in the image; and
in accordance with a position of the sticky note attached to the image, allocating contents of the sticky note to the person-in-charge corresponding to the arbitrary location in the image,
wherein the sticky note comprises a field for arbitrary data and the sticky note and the image are generated by separate applications.

\* \* \* \* \*